(12) United States Patent
Luetkens, Jr. et al.

(10) Patent No.: US 12,673,869 B2
(45) Date of Patent: Jul. 7, 2026

(54) METHOD FOR THE MANUFACTURE OF CATHODE MATERIALS

(71) Applicant: Sylvatex, Inc., Alameda, CA (US)

(72) Inventors: Melvin Louis Luetkens, Jr., Batavia, IL (US); Daniel Teav Sun, San Francisco, CA (US); Yanying Lu, Fremont, CA (US); Andrew Justl, Alameda, CA (US)

(73) Assignee: Sylvatex, Inc., Alameda, CA (US)

( * ) Notice: Subject to any disclaimer, the term of this patent is extended or adjusted under 35 U.S.C. 154(b) by 654 days.

(21) Appl. No.: 18/061,423

(22) Filed: Dec. 2, 2022

(65) Prior Publication Data

US 2023/0174380 A1    Jun. 8, 2023

Related U.S. Application Data

(60) Provisional application No. 63/285,719, filed on Dec. 3, 2021.

(51) Int. Cl.
*C01B 25/45* (2006.01)

(52) U.S. Cl.
CPC .......... *C01B 25/45* (2013.01); *C01P 2002/32* (2013.01); *C01P 2006/40* (2013.01)

(58) Field of Classification Search
CPC .......... H01M 4/5825; H01M 10/0525; H01M 10/058; H01M 2004/028; H01M 4/366;

H01M 4/625; H01M 10/052; C01B 25/45; C01P 2002/72; C01P 2006/40; Y02E 60/10; Y02P 70/50

See application file for complete search history.

(56) References Cited

U.S. PATENT DOCUMENTS

| | | | | |
|---|---|---|---|---|
| 5,985,488 A | * | 11/1999 | Mitate .................... | H01M 4/52 |
| | | | | 252/519.1 |
| 2015/0372293 A1 | * | 12/2015 | Story ................. | H01M 4/0471 |
| | | | | 429/223 |
| 2020/0168909 A1 | * | 5/2020 | Talebiesfandarani ........................ | |
| | | | | H01M 10/052 |

FOREIGN PATENT DOCUMENTS

| | | | | |
|---|---|---|---|---|
| CN | 103094568 A | * | 5/2013 | |
| JP | 2009295566 A | * | 12/2009 | |

* cited by examiner

*Primary Examiner* — Daniel S Gatewood

(57) ABSTRACT

A method of producing a particulate lithium metal oxide cathode material comprising the steps of providing an organic acid, providing a lithium compound, and providing a metal compound. The organic acid, the lithium compound, and the metal compound are mixed to form a mixture. The organic acid is melted to form a liquid organic acid, if the organic acid is provided as a solid. The mixture, including the liquid organic acid, is calcined in an atmosphere containing oxygen to form a lithium metal oxide. The lithium metal oxide is cooled and sized to produce the particulate lithium metal oxide having a predetermined average particle size.

12 Claims, 26 Drawing Sheets

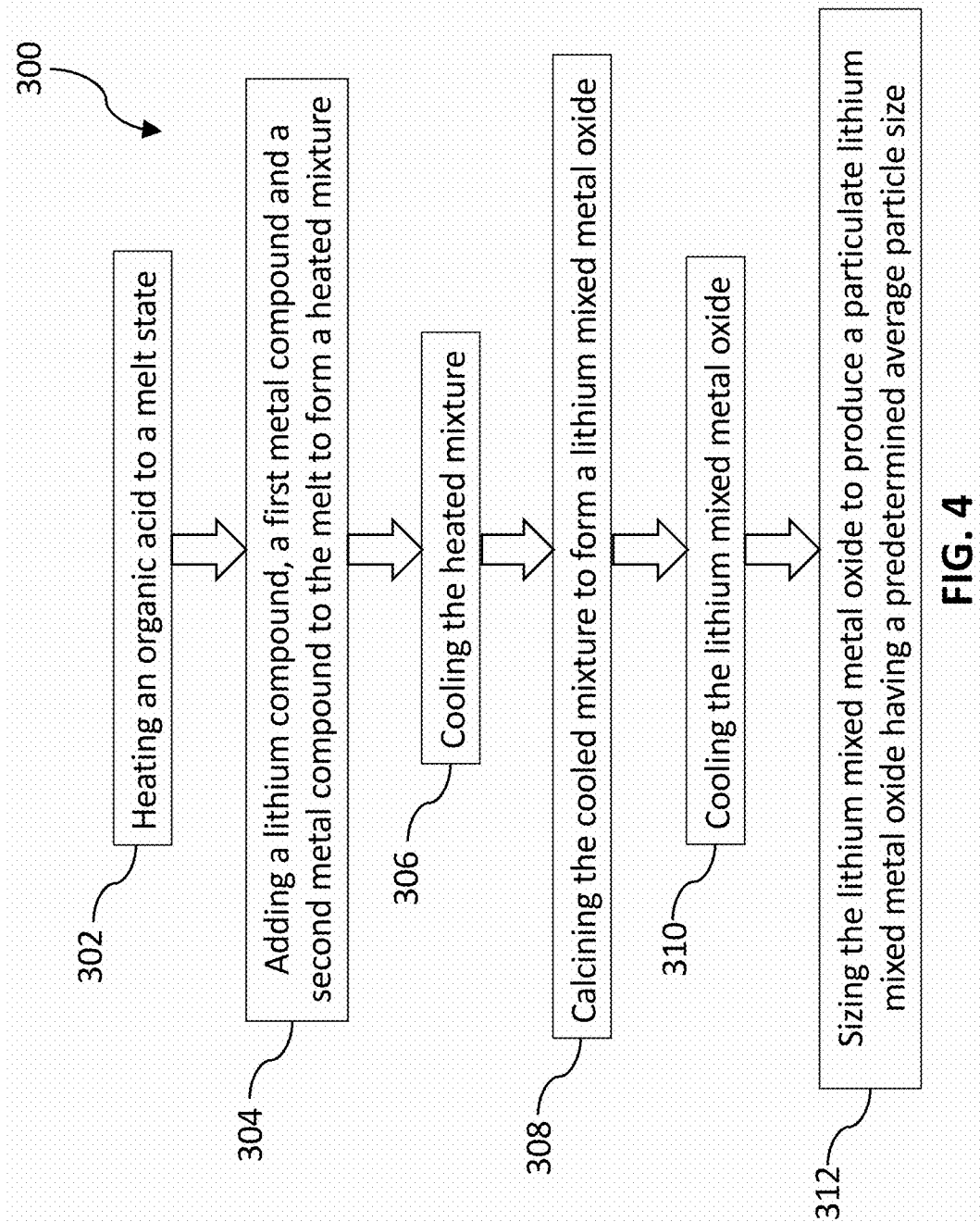

300

302 — Heating an organic acid to a melt state

304 — Adding a lithium compound, a first metal compound and a second metal compound to the melt to form a heated mixture 306 — Cooling the heated mixture 308 — Calcining the cooled mixture to form a lithium mixed metal oxide 310 — Cooling the lithium mixed metal oxide 312 — Sizing the lithium mixed metal oxide to produce a particulate lithium mixed metal oxide having a predetermined average particle size

NMC 811
reference

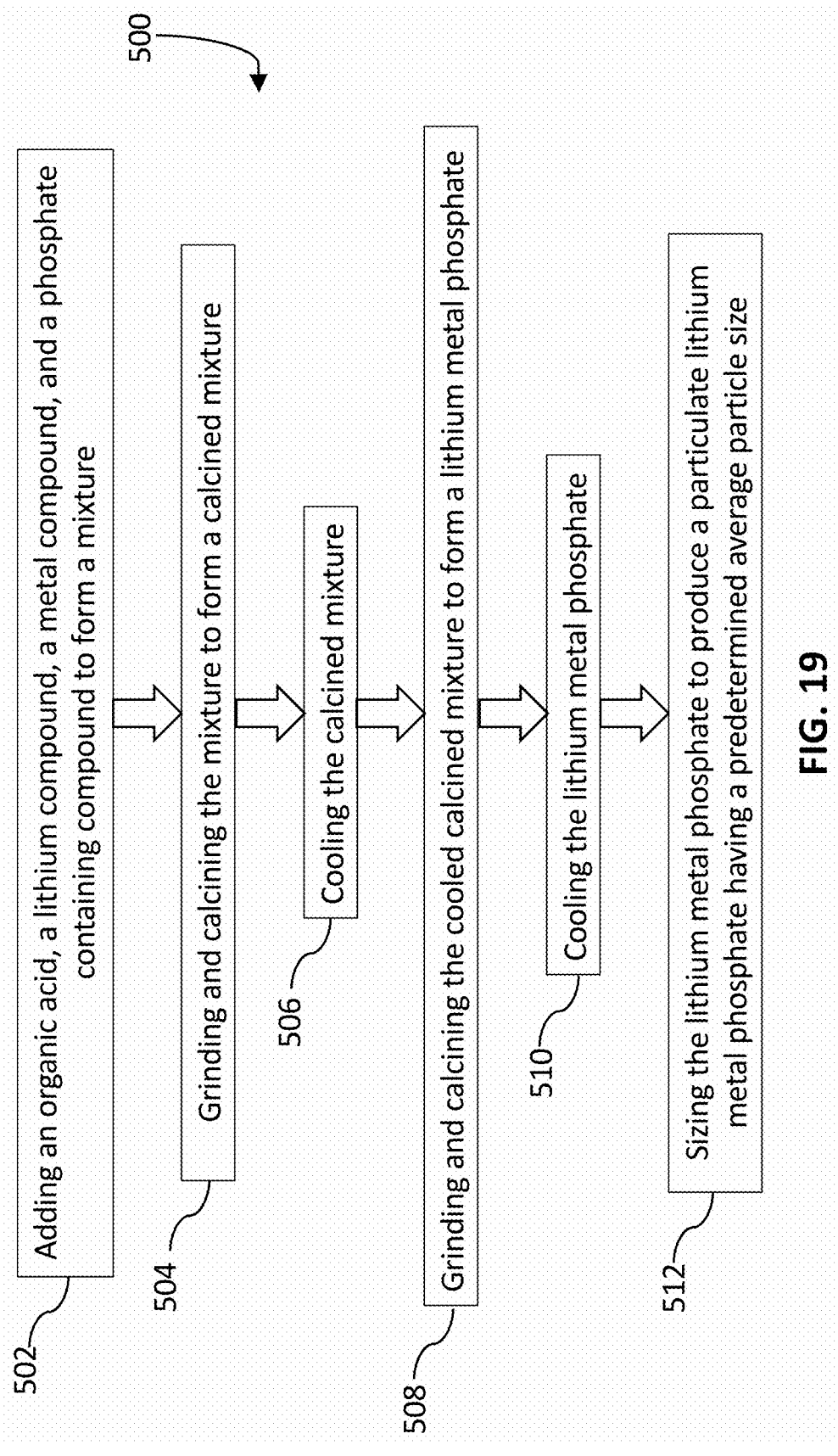

500

502 — Adding an organic acid, a lithium compound, a metal compound, and a phosphate containing compound to form a mixture 504 — Grinding and calcining the mixture to form a calcined mixture 506 — Cooling the calcined mixture 508 — Grinding and calcining the cooled calcined mixture to form a lithium metal phosphate 510 — Cooling the lithium metal phosphate 512 — Sizing the lithium metal phosphate to produce a particulate lithium metal phosphate having a predetermined average particle size

FIG. 19

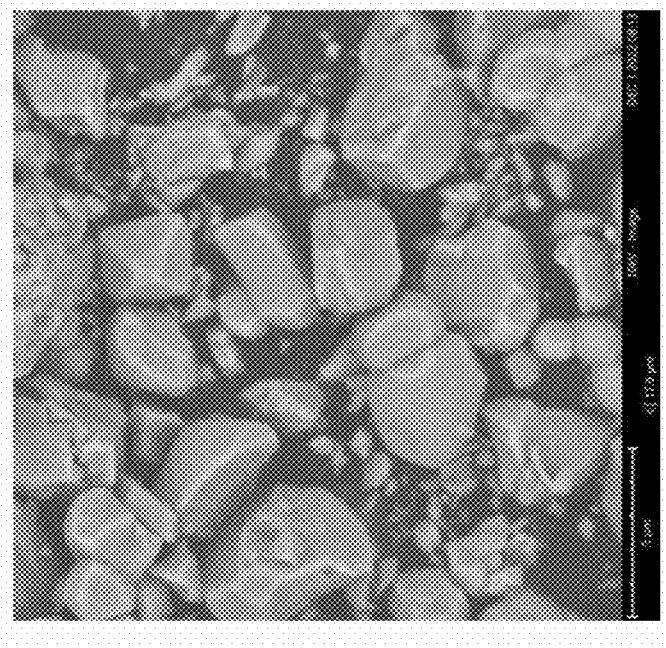
FIG. 21B
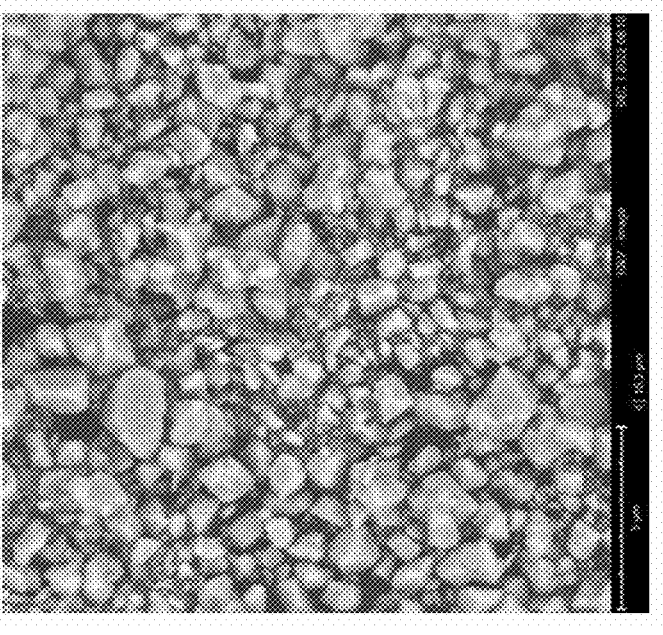
FIG. 21A

METHOD FOR THE MANUFACTURE OF CATHODE MATERIALS

CROSS-REFERENCE TO RELATED APPLICATIONS

This application claims priority to U.S. Provisional Patent Application No. 63/285,719 titled "Method for the Manufacture of Cathode Materials" filed on Dec. 3, 2021.

STATEMENT OF GOVERNMENT INTEREST

This invention was made with government support under contract DE-AR0001672 awarded by (identify the Federal agency). The government has certain rights in the invention.

TECHNICAL FIELD

The present disclosure relates to lithium-ion battery cathode materials.

BACKGROUND

Lithium-ion batteries (LIBs) have emerged as the leading technology to power electric vehicles (EVs). However, the biggest issue with making this transition today is that the demand for lithium-ion batteries far outstrips our ability to supply the market. To hit critical market adoption, the LIB must be safe, low-cost, and feature high-energy-density. Furthermore, the overall impact of battery manufacturing itself needs to have a much lower carbon footprint. It is thus critical to develop low-cost, sustainable manufacturing practices.

According to the findings by the LIFE Institute for Climate, Energy, and Society, the processes to produce the cathode make up about 45% of the greenhouse gas emissions of the total material production of LIBs. Furthermore, 80% of an EV's total lifetime emissions come from the embodied energy of fabricating the battery and then charging the battery. Conventional wet processing methods for cathode production typically create large amounts of solvents that need to be disposed of or recycled using energy-intensive collection and distillation systems. For this reason, the cathode production methods have the most potential to lower the carbon footprint of EVs.

SUMMARY

In a first aspect of the invention, the disclosure provides a method of producing a particulate lithium metal oxide cathode material comprising the steps of providing an organic acid, providing a lithium compound, and providing a metal compound. The organic acid, the lithium compound, and the metal compound are mixed to form a mixture. The organic acid is melted to form a liquid organic acid, if the organic acid is provided as a solid. The mixture, including the liquid organic acid, is calcined in an atmosphere containing oxygen to form a lithium metal oxide. The lithium metal oxide is cooled and sized to produce the particulate lithium metal oxide having a predetermined average particle size.

In another aspect of the invention, the melting step is performed before the mixing step.

In a still further aspect, the mixing step is performed before the melting step. The melting step and calcining step are achieved by a gradual addition of heat, so as to first melt the organic acid and then calcine the mixture, including the liquid organic acid.

In a yet still further aspect, the melting step and the calcining step are performed in a single apparatus and the single apparatus is a rotary calciner.

In another aspect, the method further comprises the step of cooling the mixture and sizing the cooled mixture before the calcining step.

In another aspect of the invention, the organic acid is a diacid.

In still another aspect, the diacid is oxalic acid.

In a still further aspect, the metal oxide comprises a composition of $LiM_xO_y$.

In a still another further aspect, the M is manganese, nickel, or cobalt.

In another aspect, x is 1 or 2 and y is 2 or 4.

In a still yet further aspect, the organic acid is a bidentate ligand and coordinates to the metal of the metal compound in the mixture.

In another still yet further aspect, the lithium compound or the metal compound comprises an anionic component is selected from the group consisting of hydroxide, carbonate, acetate, alkoxide, oxalate, nitrate, nitride, sulfate, and oxide.

In another aspect of the invention, the lithium metal oxide cathode further comprises an outer layer.

In still another aspect, the outer layer comprises Li and a Co-rich material.

In a still further aspect, forming the outer layer of Li and Co-rich material on the comminuted metal oxide cathode comprises the steps of tumbling the lithium metal oxide with Li and Co-containing precursor materials to form a coated lithium metal oxide, and calcining the coated lithium metal oxide to form a lithium metal oxide with a Li and Co-rich layer such that the Co does not substantially enter the structure of the lithium metal oxide portion.

In a yet still further aspect, calcining the mixture comprises the following steps of placing the mixture in a calciner, heating the mixture to about 300-400° C. at a ramp rate of up to about 15° C./min and holding for about two to four hours, heating the mixture to about 450-550° C. at a ramp rate of up to about 15° C./min and holding for about two to about four hours, and heating the mixture to about 750-850° C. at a ramp rate of up to about 4° C./min and holding for about four to six hours.

In another aspect, the method of producing a particulate lithium metal oxide cathode material further comprises adding a dopant to the mixture.

In another aspect of the invention, the lithium metal oxide cathode comprises a coating of an electrically conductive carbon.

In still another aspect, the particles are substantially single crystalline or polycrystalline and have a particle size in the range of about 1-100 microns.

In a still further aspect, the lithium metal oxide has a layered or spinel structure.

In a still yet further aspect, the metal compound is provided from a recycled cathode, recycled metal oxide, or recycled metal hydroxide.

In an aspect of the invention, a method of producing a particulate lithium mixed metal oxide Li(M1)x(M2)1-xO2 comprises providing an organic acid, providing a lithium compound Lix1(A) wherein x1 is 1-3, providing a first metal compound (M1)Ax and a second metal compound (M2)Ax where x is 1 or 2. The organic acid, the lithium compound, and the first and second metal compounds are mixed to form a mixture. The organic acid is melted to form a liquid organic acid, if the organic acid is provided as a solid. The mixture, including the liquid organic acid, is calcined in a gas comprising oxygen to yield the lithium mixed metal oxide. The lithium mixed metal oxide is cooled and sized to produce the particulate mixed metal oxide having a predetermined average particle size.

In still another aspect, the melting step is performed before the mixing step.

In a still further aspect, the mixing step is performed before the melting step.

In a still yet further aspect, the melting step and calcining step are achieved by a gradual addition of heat, so as to first melt the organic acid and then calcine the mixture, including the liquid organic acid. In another aspect of the invention, the mixing step, the melting step and the calcining step are performed in a single apparatus.

In an aspect of the invention, M1 and M2 are different metals and are selected from the group consisting of nickel, cobalt, manganese, and aluminum.

In another aspect, A is an anionic component that is selected from the group consisting of hydroxide, carbonate, acetate, alkoxide, oxalate, nitrate, nitride, sulfate, and oxide.

In a still further aspect, further combining a fourth metal compound (M4)Ax wherein x is 1 or 2 with a different metal to the mixture to form a mixed metal oxide $Li(M1)a(M2)b(M3)c(M4)dO2$ wherein $a+b+c+d=1$.

In a yet still further aspect, M1, M2, M3, and M4 are independently selected from the group consisting of nickel, cobalt, manganese, and aluminum.

In an aspect of the invention, a method of producing a particulate lithium metal phosphate $Li(M5)PO4$, comprises providing an organic acid, providing a lithium compound $Lix1(A)$ where x1 is 1-3, providing a phosphate-containing compound, and providing a metal compound $(M5)(A)x$ where x is 1 or 2, The organic acid, the lithium compound, the phosphate-containing compound and the metal compound are mixed to form a mixture. The organic acid is melted to form a liquid organic acid, if the organic acid is provided as a solid. The mixture, including the liquid organic acid, is calcined in an inert gas to yield a lithium metal phosphate. The lithium metal phosphate is cooled and sized to produce the particulate lithium metal phosphate having a predetermined average particle size In a still yet further aspect, M5 is selected from the group consisting of iron, nickel, manganese, or cobalt.

In another aspect, A is an anionic component that is selected from the group consisting of hydroxide, carbonate, acetate, alkoxide, oxalate, nitrate, nitride, sulfate, acetylacetonate, and oxide.

In another aspect of the invention the phosphate-containing compound is selected from the group consisting of $(NH_4)_3PO_4$, $H_3PO_4$, $Na_3PO_4$, $Li_3PO_4$, $K_3PO_4$, $H(NH_4)_2PO_4$, and $H_2(NH_4)PO_4$.

In still another aspect, the method includes combining one or more additional metal compounds with the liquid organic acid to form a lithium mixed metal phosphate.

In a still further aspect, the lithium mixed metal phosphate has the general formula $Li(M5)a(M6)bPO_4$ where $a+b=1$, $Li(M5)a(M6)b(M7)cPO_4$ where $a+b+c=1$, or $Li(M5)a(M6)b(M7)c(M8)dPO_4$ where $a+b+c+d=1$.

In a still yet further aspect, M5, M6, M7, and M8 are selected from the group consisting of iron, nickel, manganese, and cobalt.

Further aspects and embodiments are provided in the foregoing drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 4 is a block diagram of a melt-based, one-pot method to manufacture a particulate lithium mixed metal oxide, according to an embodiment of the disclosure.

FIG. 19 is a block diagram of a one-pot method to manufacture a particulate lithium metal phosphate, according to an embodiment of the disclosure.

FIG. 21A is an SEM of ground particles of $LiNi_{0.8}Mn_{0.1}Co_{0.1}O_2$ 884 before heat treatment.

FIG. 21B is an SEM of ground particles of $LiNi_{0.8}Mn_{0.1}Co_{0.1}O_2$ 888 after heat treatment.

DETAILED DESCRIPTION

Overview

Figure 1:
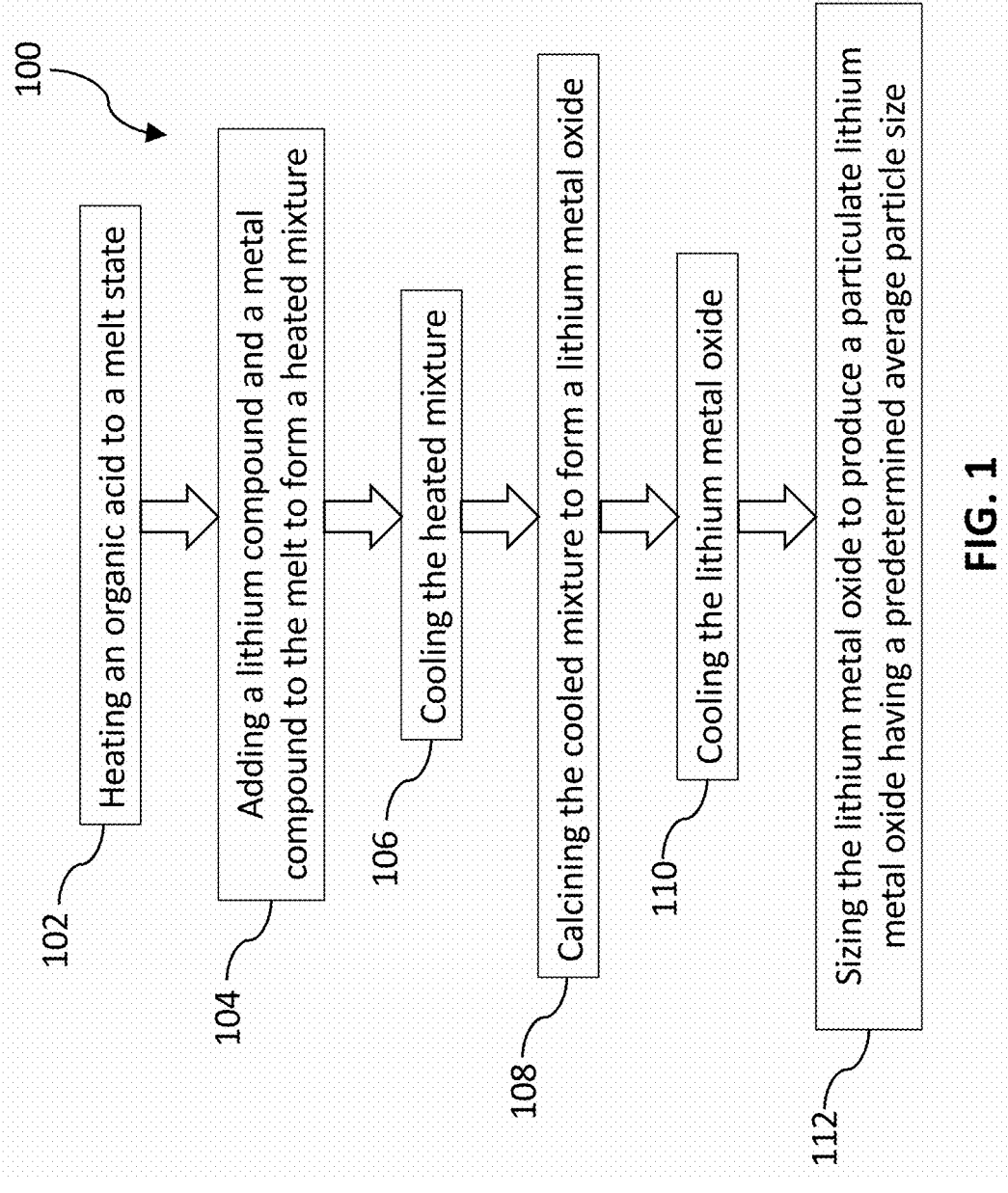
FIG. 1 is a block diagram of a melt-based, one-pot method to manufacture a particulate lithium metal oxide, according to an embodiment of the disclosure.

Embodiments of methods and compositions described herein are directed towards a melt-based method for the manufacture of cathode materials for LIBs. The method includes combining metal and lithium-based compounds or a phosphate containing compound with an organic acid in a melted or liquid state with trace amounts of water to form a heated mixture.

The manufacturing method further includes cooling the heated mixture and grinding and calcining the cooled mixture to yield a lithium metal oxide, lithium mixed metal oxide, or a lithium metal phosphate.

The manufacturing method may use recycled cathode materials to produce freshly made cathode materials with high purity and crystallinity.

Definitions

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, the term "lithium-ion battery," sometimes abbreviated as "LIB," is meant to refer to a type of rechargeable battery in which lithium ions move from the negative electrode through an electrolyte to the positive electrode during discharge, and back when charging. Li-ion batteries use an intercalated lithium compound as the material at the positive electrode and typically graphite at the negative electrode.

As used herein, the term "cathode" or "cathode material" is meant to refer to the particulate material that is used to form the cathode electrode that is, in turn, used to assemble a Li ion battery or other polarized electrical device. The cathode material is typically added to a solvent, conductive additive, adhesive, or other materials that are then mixed and coated onto a current collector to form the cathode electrode. The cathode electrode is that from which a conventional current leaves in a polarized electrical device, such as a LIB. A conventional current describes the direction in which positive charges move. Electrons have a negative electrical charge, so the movement of electrons is opposite to that of the conventional current flow.

As used herein, the term "comminution" is meant to refer to the reduction of solid materials from one average particle size to a smaller average particle size, by crushing, grinding, cutting, vibrating, milling or other processes. Impact, shear, and compression forces are typically used to effect the comminution of particles.

As used herein, the term "dopant" or "doping agent" is meant to refer to a trace or small amount of impurity element that is introduced into a chemical material to alter its original electrical or optical properties. The amount of dopant necessary to cause changes is typically very low. The amount of dopant may be in the range of about 0.001-5% or about 0.001-1% by mass. When doped into crystalline substances, the dopant's atoms get incorporated into its crystal lattice.

As used herein, the term "spinel" is meant to refer to a class of materials with a spinel crystal structure with the general formula $AB_2X_4$ which crystallize in the cubic (isometric) crystal system, with the X anions (typically chalcogens, like oxygen and sulfur) being arranged in a cubic close-packed lattice and the cations A and B occupying some or all of the octahedral and tetrahedral sites in the lattice.

As used herein, the term "layered structure" is meant to refer to a class of materials with the general formula $A_xBO_2$ where A is an alkali cation, B is a metal cation, and O is an oxygen anion. The O anions form a face-centered cubic (FCC) framework with octahedral and tetrahedral sites. These two environments are face sharing and form a topologically connected network.

As used herein, the term "particle separation methods" is meant to refer to methods to separate particles based on differences in size, shape, physical or chemical properties of the particles. Solid particles, such as cathode materials described herein, are typically separated by their dimensions (size) using such methods as wet or dry sieving or screening, classifiers, or cyclones.

As used herein, the term "solid-electrolyte interphase (SEI)" is meant to refer to a thin layer that is formed on the surface of the anode from the electrochemical reduction of the electrolyte and plays a crucial role in the long term cyclability of a lithium-based battery. The SEI is typically about 100-120 nm thick, and is mainly composed of various inorganic components, such as lithium carbonate ($Li_2CO_3$), lithium fluoride (LiF), lithium oxide ($Li_2O$), lithium hydroxide (LiOH), as well as some organic components such as lithium alkyl carbonates.

As used herein, the term "calcine" means to expose to strong heat. This may occur in a conventional gas fired or electrical furnace or through other means such as flame pyrolysis, plasma pyrolysis, or a dynamic recrystallization process, such as Geometric Dynamic Recrystallization (GDRX).

Exemplary Embodiments

The present disclosure relates to methods of manufacturing particulate metal oxide and mixed metal oxide. In a one method, a melt-based, one-pot, method is disclosed where an organic acid is first heated to a melted state. The heating of the organic acid may be carried out in the presence of a trace amount of water. In some embodiments, the organic acid may be in a liquid state at room temperature. A lithium-based compound and one or more metal-based compounds in desired stoichiometries are added to the liquid organic acid to form a mixture wherein the mixture may be heated. The heated mixture is cooled and the cooled mixture is calcined in the presence of oxygen/air to yield calcined lithium metal oxides or lithium mixed metal oxides. The calcined oxides can be sized to produce the particulate metal oxide having a predetermined average particle size.

In another method, a one-pot method is disclosed where the organic acid, a lithium-based compound and one or more metal-based compounds are combined and mixed together at room temperature then heated in the presence of oxygen/air to form a heated mixture. The heated mixture is then cooled to room temperature and ground to form a ground mixture. The ground mixture is then calcined in the presence of oxygen/air to yield calcined lithium metal oxides or lithium mixed metal oxides. The calcined oxides can be sized to produce the particulate metal oxide having a predetermined average particle size.

In various exemplary embodiments, the metal oxides comprise the general formula $LiM_xO_y$, where M is a transition metal, including nickel (Ni), manganese (Mn), cobalt (Co), iron (Fe), aluminum (Al), titanium (Ti), etc., and where x=1, y=2 or where x=2 and y=4.

In other various exemplary embodiments, the lithium mixed metal oxides comprise two or different metals with general formula $Li(M1)_x(M2)_yO_2$ where M1 and M2 are different metals and where M1 and M2 are Ni, Mn, Co, or Al, and further where x+y=1.

Lithium mixed metal oxides may comprise three different metals with general formula $Li(M1)_x(M2)_y(M3)_zO_2$ where M1 is Ni, M2 is Mn, and M3 is Co, or where M1 is Ni, M2 is Co and M3 is aluminum (Al), and where x+y+z=1.

Lithium mixed metal oxides may comprise three different metals with general formula $Li(M1)_x(M2)_y(M3)_z(M4)_{x'}O_2$ where M1 is Ni, M2 is Mn, and M3 is Co, and M4 is aluminum (Al), and where x+y+z+x'=1.

In various embodiments, the one-pot organic acid-based methods can also be used to manufacture metal phosphate-based cathode materials. These materials include $LiCoPO_4$ and $LiFePO_4$.

In other various embodiments, dopants, or excess lithium (Li) may additionally be added to the mixtures. The dopants preferably replace a portion of the metal component in the particulate cathode materials.

In other various exemplary embodiments, the particulate cathode materials may further comprise a coating. The coating is used to stabilize or improve the cycling and electrical conductivity properties of the particles.

In various embodiments, particulate cathode materials can be made with used and recycled cathode materials using the one-pot, organic acid-based synthetic methods disclosed.

In other various embodiments, the size of single crystalline cathode particles synthesized by the organic acid-based methods can be increased by heat treatment without loss of crystal phase as determined by XRD analysis.

Lithium Metal Oxides

The following embodiments relate to methods to manufacture a metal oxide, in particular a lithium metal oxide.

FIG. 1 is a block diagram of a melt-based, one-pot method 100 to manufacture a particulate lithium metal oxide, according to an embodiment of the disclosure. In a first step 102, an organic acid is heated to form a melt state. Alternatively, the organic acid is a liquid at ambient temperatures and may not need to be heated at this step. Two or more organic acids may also be used in the synthesis of the lithium metal oxide.

The organic acid may be a single monoacid, diacid, or tri-acid or a mixture thereof. The monoacid comprises at least two carbon atoms and a single carboxylic acid group, the diacid comprises at least two carbon atoms and two carboxylic acid groups, and the triacid comprises at least three carbon atoms and three carboxylic acid groups. Other higher order acids may be used where the acid may comprise four or more carbon atoms and four or more carboxylic acid groups. The organic monoacids, diacids, and triacids may comprise at least one linear or branched alkyl chain. The organic acid may be a fatty acid.

An organic monoacid may be ethanoic acid, propanoic acid, decanoic acid, benzoic acid, stearic acid, or butyric acid or other similar monoacids or mixtures thereof. An organic diacid may be oxalic acid, malonic acid, succinic acid, glutaric acid, adipic acid, maleic acid, fumaric acid, phthalic acid, isophthalic acid, terephthalic acid, or other similar diacids or mixtures thereof. An organic triacid may be citric acid, isocitric acid, aconitic acid, propane-1,2,3-tricarboxylic acid, agaric acid, trimeric acid, or other similar triacids or mixtures thereof. Currently, oxalic acid is the preferred organic acid to use for the melt. Because oxalic acid is a solid at ambient temperature, it is preferred to add heat and melt the oxalic acid at some point before calcining. Most preferably, the oxalic acid is melted before adding the other components of the mixture. Alternatively, the other components may be added and then the organic acid is melted. In still another alternative embodiment, the organic acid is melted as the mixture is brought up to temperature for calcining. In yet another alternative embodiment, the organic acid which is already a liquid at ambient temperatures is used.

While oxalic acid is currently most preferred, and other organic acids are preferred, alternative embodiments can be carried out with other hydrocarbons in their place. Such other hydrocarbons should aid in solubilizing the lithium and other metal compounds. For example, alcohols, dialcohols, esters and diesters may be used.

In some embodiments, an organic acid may be used for the formation of particulate metal oxides, mixed metal oxides, and lithium phosphates described herein that is a liquid at room temperature. For example, the room temperature liquid acid may be an unsaturated acid. The liquid acid may be propionic acid, butyric acid, formic acid, or acetic acid or other similar acids or combinations thereof. Preferably, the organic acid is a solid at ambient temperatures, thus necessitating the addition of heat to melt the solid organic acid.

In some embodiments, a portion of water is added to the organic acid before or during heating of the organic acid. In some instances, only a trace of water is added. In other instances, water is added in the range of about 0.001 to about 100 weight % of the mass of the organic acid. The water may be 0.001% to about 80 wight %, or 0.001 to about 60%, or 0.001 to about 40%, or still about 0.001 to about 20%, or preferably about 0.001 to about 10 weight % of the organic acid. In the preferred embodiment, which uses oxalic acid, the water is added to ensure formation of the dihydrate. This is preferred because the dihydrate of oxalic acid has a lower melting point, i.e., 101.5° C., compared to the melting point of anhydrous oxalic acid, i.e., 189 to 191° C.

As illustrated for this embodiment, the next step 104 in the method 100 to manufacture a lithium metal oxide is to add a lithium compound and a metal compound to the organic acid to form a mixture. When the organic acid is otherwise a solid at ambient temperatures and heat is added to melt it, the lithium metal oxide is preferably added to the melted organic acid.

The lithium compound has a general formula of $Li_xA$ wherein x is 1-3 and where A is an anionic component. The metal compound has a general formula of $MA_x$ wherein x is 1 or 2 and where A is an anionic component. The lithium and metal compounds may be pre-mixed before addition to the organic acid melt or may be added in a sequential manner. The addition of the compounds may be added in one portion or may be added over a predetermined period of time. The heated mixture is then stirred for about 1 minute to about 24 hours while heating is maintained.

The anionic component (A) in the lithium and metal compounds is selected from the group consisting of hydroxide, carbonate, acetate, alkoxide, oxalate, nitrate, nitride, sulfate, acetylacetonate, and oxide. A mixture of one or more lithium and metal compounds with different anionic components (A) may be added to the heated mixture or only a single anionic component may be added. The lithium and metal compounds may have the same or different anionic components.

The metal component M in the metal compound may preferably be Ni, Mn, or Co. The metal component in the form of metal ions such as Ni(II), Mn(II), or Co(II) may be coordinated by one or more organic mono-, di-, or tri-acids. The diacids, such as oxalic acid, may act as a bidentate ligand which may aid in dissolving and homogenously dispersing the metal ion in the melt. The metal component may also be selected from the group consisting of aluminum (Al), titanium (Ti), iron (Fe), vanadium (V), magnesium (Mg), zirconium (Zr), tungsten (W), tantalum (Ta), and boron (B).

In some embodiments, one or more optional dopants may be added to the melt. The dopant is preferably a transition metal in ionic form. The dopant may be selected from the group consisting of aluminum (Al), titanium (Ti), zirconium (Zr), magnesium (Mg), boron (B), fluorine (F), W, molybdenum (Mo), V, Ta, gallium (Ga), niobium (Nb), zinc (Zn), cesium (Cs), and calcium (Ca). The one or more dopants preferably replaces a portion of the metal component in the lithium metal oxide.

In some embodiments, the lithium and metal compounds may be mixed and then the mixture may then be added to the organic acid.

A stoichiometric excess of the lithium compound may be added to the heated mixture. This is to make up for any lithium that may sublimate and be lost during the calcining step. An excess of lithium may also be desired such as when a battery cell proceeds through a formation process. Excess lithium may be beneficial to aid in the initial formation of the solid-electrolyte interphase (SEI) layer during the formation process and during continual cycling.

In some embodiments, recycled cathode, recycled metal hydroxide, or recycled metal oxide may be used as a feed material source for the metal component for the production of lithium metal oxides, lithium mixed metal oxides, and lithium metal phosphates described herein. For example, the feed material source may be collected from recycling of lithium metal batteries or from other industrial sources. In order to balance the stoichiometry, virgin metal oxides or metal hydroxides may be added to the recycled metal oxides or metal hydroxides synthesis to maintain a target stoichiometry.

After continued heating and cooling of the melt, the next step 106 in method 100 comprises cooling the heated mixture to room temperature to form a cooled mixture. In some embodiments, the mixture may be cooled to just below the melting point of the organic acid component. The cooled mixture may be comminuted to fine particles.

In some embodiments, step 106 may be eliminated such that there is no cooling step before the heated mixture 104 is calcined at high temperatures to form the lithium metal oxide.

After cooling the heated mixture to form a cooled solid, the cooled solid is then calcined 108 to form a lithium metal oxide. The solid may be calcined in a furnace, such as a tube furnace, atmosphere-controlled muffle furnace, or a rotary calciner. A shuttle calciner or a box calciner may also be utilized.

The calcining process may comprise the following steps:
placing the solid in a calciner or furnace;
heating the solid to about 300-400° C. at a ramp rate of about 0.5 to about 30° C./min and holding for about 0.5 to 10 hours;
heating the solid to about 450-550° C. at a ramp rate of about 0.25 to about 15° C./min and holding for about 0.5 to about 10 hours; and
heating the solid to about 750-1000° C. at a ramp rate of up to about 0.25 to about 10° C./min and holding for about 0.5 to 10 hours.

The solid is preferably calcined in an atmosphere that includes oxygen. The atmosphere may be air or oxygen. The atmosphere may be a gas that comprises oxygen such as a mixture of nitrogen or argon and oxygen.

Other heat treatment methods may be used in the calcining process to produce the cathode materials described herein, such as flame pyrolysis, plasma pyrolysis, or dynamic recrystallization process. The heat treatment process may also comprise a multi-stage processing system to convert one or more precursor compounds into a cathode material wherein the system comprises a mist generator, a drying chamber, one or more gas-solid separators, and one or more in-line reaction modules further comprising one or more gas-solid feeders, one or more gas-solid separators, and one or more reactors.

The lithium metal oxide is then cooled 110 to form a particulate lithium metal oxide that is preferably suited to be used as a cathode material in a lithium ion battery. The lithium metal oxide may have the general formula $LiM_xO_y$, wherein M is manganese, nickel, or cobalt and wherein x is 1 or 2 and wherein y is 2 or 4. The lithium metal oxide may have a spinel or layered structure. The lithium metal oxide may be polycrystalline or single crystalline or a combination thereof.

The lithium metal oxide may be comminuted. The comminuted or non-comminuted lithium metal oxide may be sized 112 to produce a particulate lithium metal oxide having a predetermined average particle size. The particle sizing may be carried out by a variety of particle separation methods. The lithium metal oxide preferably has an average particle size in the range of about 1 to 1000 microns, or more preferably in the range of about 1 to 100 microns, or even more preferably in the range of about 1 to 20 microns.

Figure 2:
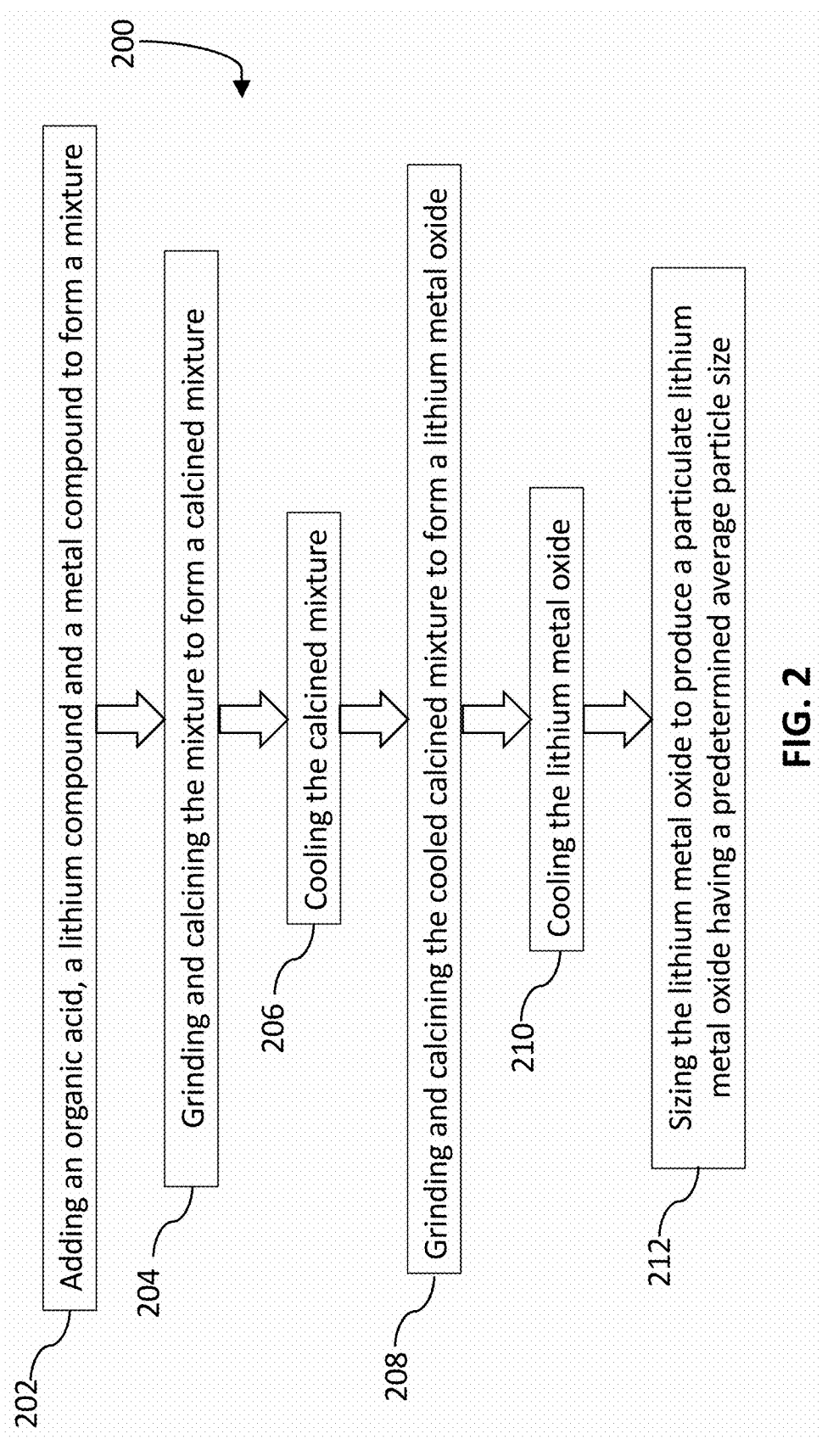
FIG. 2 is a block diagram of a one-pot method to manufacture a particulate lithium metal oxide, according to an embodiment of the disclosure.

FIG. 2 is a block diagram of a one-pot method 200 to manufacture a particulate lithium metal oxide, according to an embodiment of the disclosure. This method 200 is similar to method 100 but the organic acid, lithium compound, the metal compound, and one or more optional dopants may be added together in a desired stoichiometry at room temperature and mixed to form a mixture 202. More than one organic acids may be used. The mixture is ground then calcined to form a calcined mixture 204. The first calcining process may comprise the following steps to form a calcined mixture under an oxygen-rich atmosphere with a flow rate of about 1-3 L/min:
placing the solid in a calciner or furnace;
heating the solid to about 125-175° C. at a ramp rate of about 0.5 to about 20° C./min and holding for about 1 to 5 hours;
heating the solid to about 200-300° C. at a ramp rate of about 0.5 to about 20° C./min and holding for about 3 to about 7 hours;
heating the solid to about 300-400° C. at a ramp rate of about 0.5 to about 20° C./min and holding for about 1 to about 5 hours; and
heating the solid to about 500-600° C. at a ramp rate of up to about 0.5 to about 20° C./min and holding for about 3 to 7 hours.

The calcined mixture is cooled to room temperature 206 at a rate of about 0.5 to 20° C./min. The first calcined mixture is then ground and calcined 208 to form a lithium metal oxide cathode. The first calcining process may comprise the following steps to form a calcined mixture under an oxygen-rich atmosphere with a flow rate of about 1-3 L/min:
placing the solid in a calciner or furnace; and
heating the solid to about 850-1000° C. at a ramp rate of about 0.5 to about 20° C./min and holding for about 10 to 20 hours.

The lithium metal oxide is then cooled to room temperature at a rate of about 0.5 to 5° C./min 210. The cooled lithium metal oxide may then be sized to produce a lithium metal oxide having a predetermined average particle size 212.

Method 200 is similar to method 100 in that in method 200, a slow ramp is used to 125-175° C. to first melt the organic acid. Then a slow ramp is used to further increase the temperature to begin the formation of the lithium metal oxide at higher temperatures.

In some embodiments, step 206 may be eliminated such that a single calcining step is used to form the lithium metal oxide from the mixture formed in step 202.

Figures 3A, 3B, 3C:
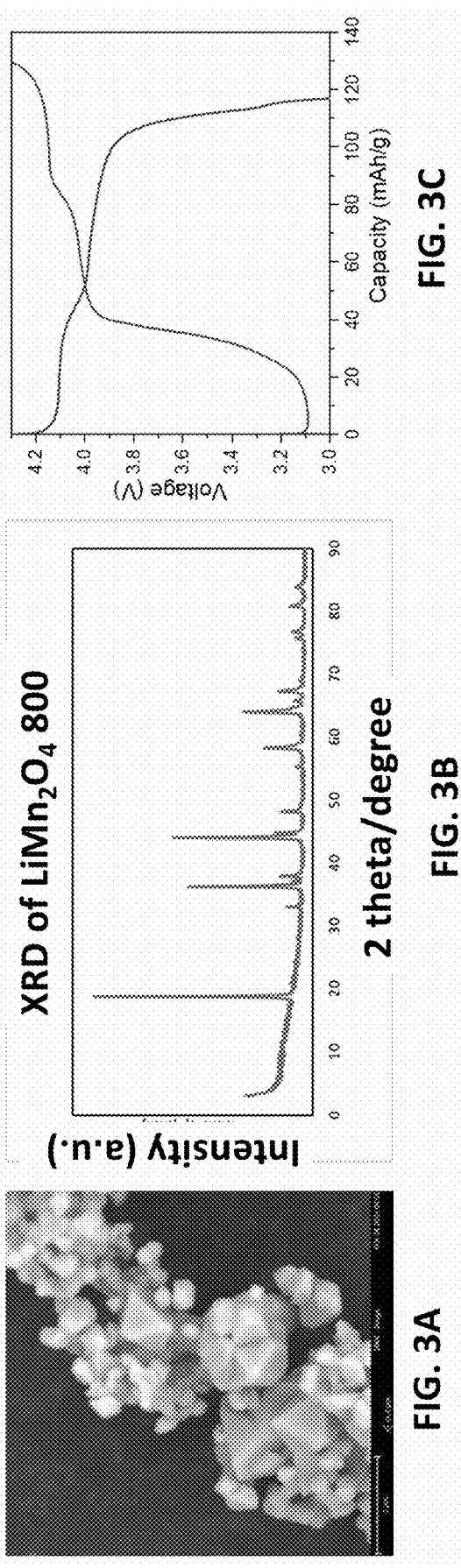
FIG. 3A is a Scanning Electromicrograph (SEM) of particles of $LiMn_2O_4$ 800 synthesized using the one-pot method.
FIG. 3B is the X-Ray Diffraction (XRD) pattern of $LiMn_2O_4$ 800 synthesized using the one-pot method.
FIG. 3C is a plot of the first charge and discharge of $LiMn_2O_4$ 800 synthesized using the one-pot method, according to an embodiment of the disclosure.

FIG. 3A is an SEM of particles of $LiMn_2O_4$ 800 synthesized using the one-pot method 200, according to an embodiment of the disclosure. The scanning electron microscopy (SEM) shows the particles are single crystalline FIG. 3B is the XRD pattern of $LiMn_2O_4$ 800 synthesized using the one-pot method, according to an embodiment of the disclosure. The pattern shows the particles are pure phase FIG. 3C is a plot of the first charge and discharge of $LiMn_2O_4$ 800 synthesized using the one-pot method, according to an embodiment of the disclosure. The half-cell first charge (3.1-4.3V) and first discharge rates used were both 0.1 C. The first charge capacity is about 129.3 mAh/g while the first discharge capacity is about 116.7 mAh/g for a first discharge efficiency of 90.3%.

In some embodiments, a coating or layer may be further deposited onto the surface of the lithium metal oxide formed by the one-pot methods disclosed herein. The coating can influence particle interfacial properties in beneficial ways. The coating can also prevent the cathode materials from direct contact with the electrolyte and avoid decomposition or oxidation of the electrolyte which leads to improved cycle and storage life of the battery. The coating may comprise a metal oxide such as $Al_2O_3$, $ZrO_2$, $TiO_2$, $B_2O_3$, $MoO_3$, or $WO_3$. The coating may also comprise a phosphate, fluorides such as $AlF_3$, $MgF_2$, $CeF_2$, or $CaF_2$, or conducting polymer. The coating may also comprise a solid electrolyte. The coating may comprise a fast ionic conductor such as $LiAlO_2$, $Li_3ZrO_2$, $Li_2O$-$2B_2O_3$, $Li_3PO_4$, $Li_2ZrO_3$, or $Li_2WO_4$. The coating may also comprise a second lithium metal oxide material.

A coating may be deposited onto the lithium metal oxide such by dispersing in a solution of the coating precursor materials or be tumbled with solid precursor materials. In both methods, the lithium metal oxides with the coating of precursor materials are then calcined to form coating on the surface. The coating may be a continuous or non-continuous coating. The coating may have a thickness in the range of preferably about 1 to about 100 nm, more preferably about 1 to about 50 nm or even more preferably about 1 to about 20 nm.

In an embodiment, the lithium metal oxide may be dispersed in a solution comprising coating precursor materials to form a dispersion. The dispersion may be dried, such as by spray drying to flash dry the lithium metal oxide particles with a uniform coating of precursor materials. The particles may then be calcined to form an adhered coating on the surface.

In another method to form a coating on the lithium metal oxide surface, the lithium metal oxide may be tumbled with solid precursor materials followed by calcining to form a surface layer. In one specific example, forming the outer layer of Li and Co-rich material on the lithium metal oxide surface comprises tumbling the metal oxide with Li and Co-containing precursor materials to form a coated lithium metal oxide; and then calcining the coated lithium metal oxide to form a lithium metal oxide with a Li and Co-rich layer such that the Co does not substantially enter the structure of the metal oxide portion.

Lithium Mixed Metal Oxides

The following embodiments relate to a method to manufacture a mixed metal oxide, in particular a lithium mixed metal oxide. The lithium mixed metal oxide may be single crystalline or polycrystalline.

FIG. 4 is a block diagram of a melt-based, one-pot method 300 to manufacture a particulate lithium mixed metal oxide, according to an embodiment of the disclosure. The method illustrated in FIG. 4 is similar to method 100 for producing a lithium metal oxide. In method 300, heating an organic acid 302 is followed by adding a lithium compound, a first metal compound M1(A) and a second metal compound to the melt 304 wherein the two metal compounds comprise two different metals to form a heated mixture. The heated mixture is then cooled 306 to form a solid. The solid is then calcined to form a calcined solid 308 wherein cooling the calcined solid forms a lithium mixed metal oxide 310 with formula $Li(M1)_x(M2)_{1-x}O_2$. Transition metals M1 and M2 may be selected from the group consisting of nickel, manganese, cobalt, and aluminum. In some embodiments, cooling step 306 may be eliminated.

In some embodiments, the calcined lithium mixed metal oxide $Li(M1)_x(M2)_{1-x}O_2$ may optionally be comminuted and sized to produce a particulate lithium mixed metal oxides having a predetermined average particle size 312.

Lithium mixed metal oxides with general formula $Li(M1)_a(M2)_b(M3)_cO_2$ wherein a+b+c=1 may also be synthesized using method 300 disclosed in FIG. 4. In step 304, a third metal compound is added to the melt wherein metals M1, M2, and M3 are all different.

Lithium mixed metal oxides with general formula $Li(M1)_a(M2)b(M3)_c(M4)_dO_2$ wherein a+b+c+d=1 may also be synthesized using method 300 disclosed in FIG. 4. In step 304, a third metal compound and a fourth metal compound are added to the melt wherein metals M1, M2, M3, and M4 are all different. Metals M1, M2, M3, and M4 may preferably be selected from the group consisting of nickel, manganese, cobalt, and aluminum. Metals M1, M2, M3, and M4 may also be selected from the group consisting of Al, Ti, Zr, Mg, B, F, W, Mo, V, Ta, Ga, Nb, and Ca.

One or more optional dopants may be added to the reaction mixture for any of the lithium mixed metal oxides. The dopant is preferably a transition metal in ionic form. The dopant may be selected from the group consisting of Al, Ti, Zr, Mg, B, F, W, Mo, V, Ta, Ga, Nb, Zn, Cs, and Ca.

A particulate lithium mixed metal oxide may be also be formed using a similar one-pot method described in method 200 in FIG. 2. One or more organic acids, a lithium compound, two or more metal compounds and one or more optional dopants may be combined and mixed together in a desired stoichiometric ratio then calcined to form a calcined mixture. The calcined mixture is cooled to room temperature, ground, then calcined again at a higher temperature to form a calcined solid. The calcined solid is then cooled and sized to form a particulate lithium mixed metal oxide.

The synthetic methods disclosed herein may further comprise a fluorine (F)-based reagent in the reaction mixture, such as $NiF_2$, $CoF_2$, $MnF_2$, LiF, or $NH_4F$. The fluorine atoms may be incorporated into the oxygen layer and replace some of the oxygen atoms. Metal oxide with fluorine incorporated may have the resulting formula of $LiMO_{2-x}F_x$ where M comprises one or more of Mn, Ni, Co, and Al and where x<0.05. Lithium metal oxide cathodes with fluorine doped on the oxygen site may show improved thermal stability when the cathodes are charged to high voltages.

In some embodiments, any fraction of lithium metal oxide or lithium mixed metal oxide that is collected after a particle separation method is carried out wherein the particle size is too small or too large may be re-used for the synthesis of another batch of lithium metal or mixed metal oxide.

Figures 5A, 5B:
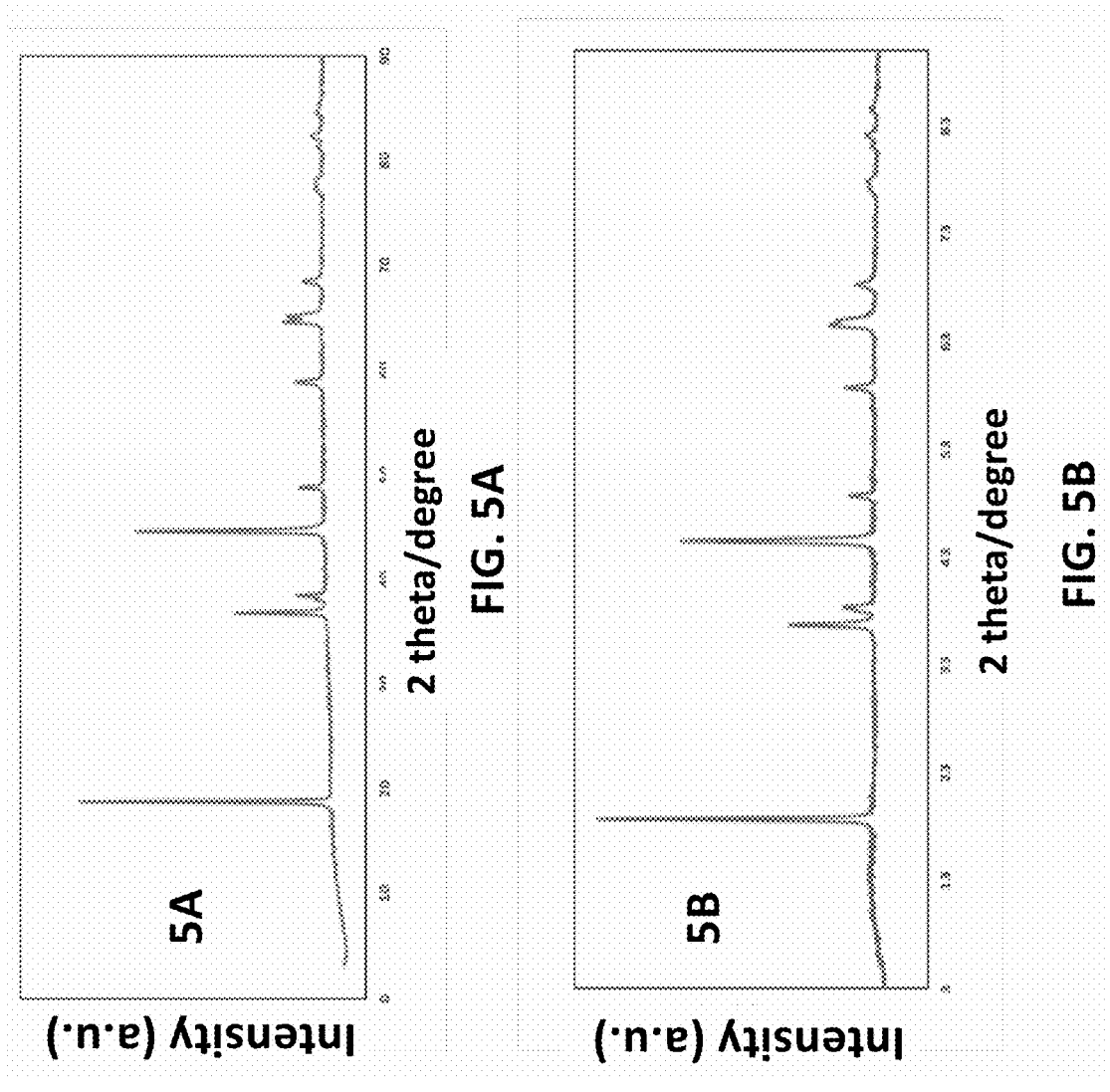
FIG. 5A is the XRD pattern for $LiNi_{0.6}Mn_{0.2}Co_{0.2}O_2$ 804 synthesized from manganese and cobalt oxide precursor metal compounds.
FIG. 5B is the XRD pattern $LiNi_{0.6}Mn_{0.2}Co_{0.2}O_2$ 808 synthesized from manganese oxide precursor metal compound.

FIG. 5A is the XRD pattern for $LiNi_{0.6}Mn_{0.2}Co_{0.2}O_2$ 804 synthesized from manganese and cobalt oxide precursor metal compounds. The XRD shows a pure phase was formed for that was synthesized using melt-based, one-pot method 100.

FIG. 5B is the XRD pattern $LiNi_{0.6}Mn_{0.2}Co_{0.2}O_2$ 808 synthesized from manganese oxide precursor metal compound. The XRD shows a pure phase was formed for that was synthesized using melt-based, one-pot method 100.

Synthesis of $LiNi_{0.6}Mn_{0.2}Co_{0.2}O_2$ Using Oxalic Acid or Stearic Acid

Figures 6A, 6B, 6C:
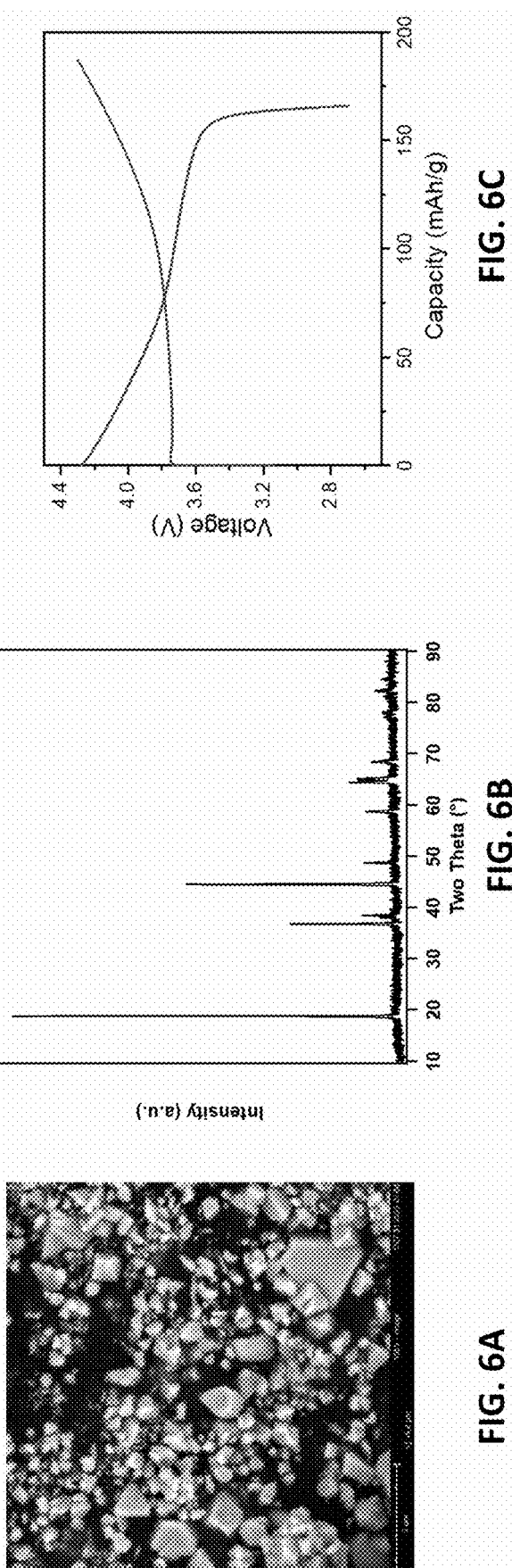
FIG. 6A is an SEM of particles of $LiNi_{0.6}Mn_{0.2}Co_{0.2}O_2$ 812 synthesized using the one-pot method.
FIG. 6B is the XRD pattern of $LiNi_{0.6}Mn_{0.2}Co_{0.2}O_2$ 812 synthesized using the one-pot method.
FIG. 6C is a plot of the first charge and discharge of $LiNi_{0.6}Mn_{0.2}Co_{0.2}O_2$ 812 synthesized using the one-pot method.

FIG. 6A is an SEM of particles of $LiNi_{0.6}Mn_{0.2}Co_{0.2}O_2$ 812 synthesized using the one-pot method 200. The method used oxalic acid as the organic acid. The particles are single particles that do not show any agglomeration.

FIG. 6B is the XRD pattern of $LiNi_{0.6}Mn_{0.2}Co_{0.2}O_2$ 812 synthesized using the one-pot method 200. The XRD shows pure phase $LiNi_{0.6}Mn_{0.2}Co_{0.2}O_2$ has been formed.

FIG. 6C is a plot of the first charge and discharge of $LiNi_{0.6}Mn_{0.2}Co_{0.2}O_2$ 812 synthesized using the one-pot method 200. The 0.1 C first half-cell charge capacity is about 187.3 mAh/g and 0.1 C first half-cell discharge is about 166.2 mAh/g for a first discharge efficiency of about 88.7%. The electrolyte used was 1.2M LiPF6 in a mix of ethylene carbonate (EC):ethylmethyl carbonate (EMC) ratio of 3:7 by weight. The cathode 812 was dried in a vacuum oven at 125° C. for at least 24 h before use.

Figures 7A, 7B:
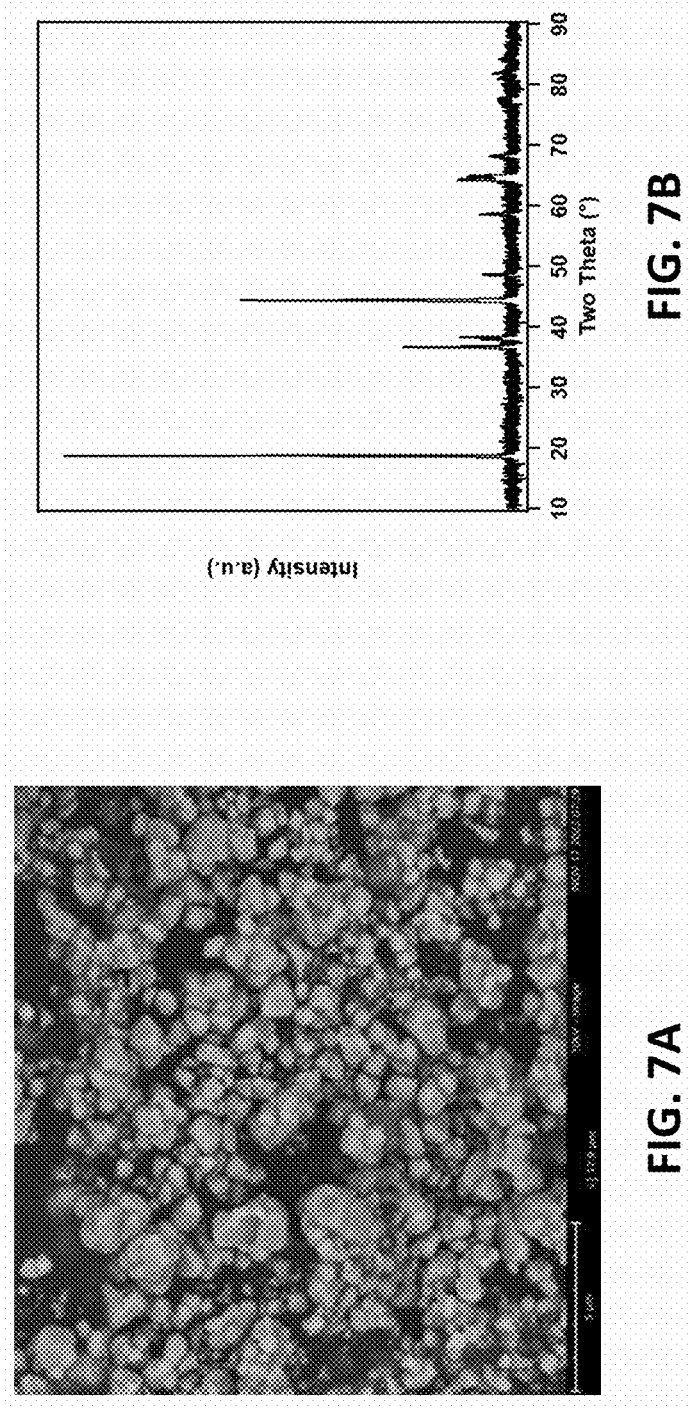
FIG. 7A is an SEM of particles of $LiNi_{0.6}Mn_{0.2}Co_{0.2}O_2$ 816 synthesized using the one-pot method 200 and with stearic acid.
FIG. 7B is the XRD pattern of $LiNi_{0.6}Mn_{0.2}Co_{0.2}O_2$ 816 synthesized using the one-pot method and with stearic acid.

To show the versatility of the organic acid cathode synthesis method 200, the synthesis of $LiNi_{0.6}Mn_{0.2}Co_{0.2}O_2$ 812 was repeated but stearic acid was used instead of oxalic acid. FIG. 7A is an SEM of particles of $LiNi_{0.6}Mn_{0.2}Co_{0.2}O_2$ 816 synthesized using the one-pot method 200 and with stearic acid. Single crystal particles are observed in the SEM.

FIG. 7B is the XRD pattern of $LiNi_{0.6}Mn_{0.2}Co_{0.2}O_2$ 816 synthesized using the one-pot method 200 and with stearic acid. Pure phase $LiNi_{0.6}Mn_{0.2}Co_{0.2}O_2$ was formed. Stearic acid or oxalic acid may be used to form high purity $LiNi_{0.6}Mn_{0.2}Co_{0.2}O_2$.

Increasing Ni Content in Mixed Metal Layered Oxides

The Ni content was increased and Al dopant was added in the cathode using method 200. FIG. 8A is an SEM of particles of $LiNi_{0.75}Mn_{0.1}Co_{0.1}Al_{0.05}O_2$ 820 synthesized using the one-pot method 200.

Figure 8B:
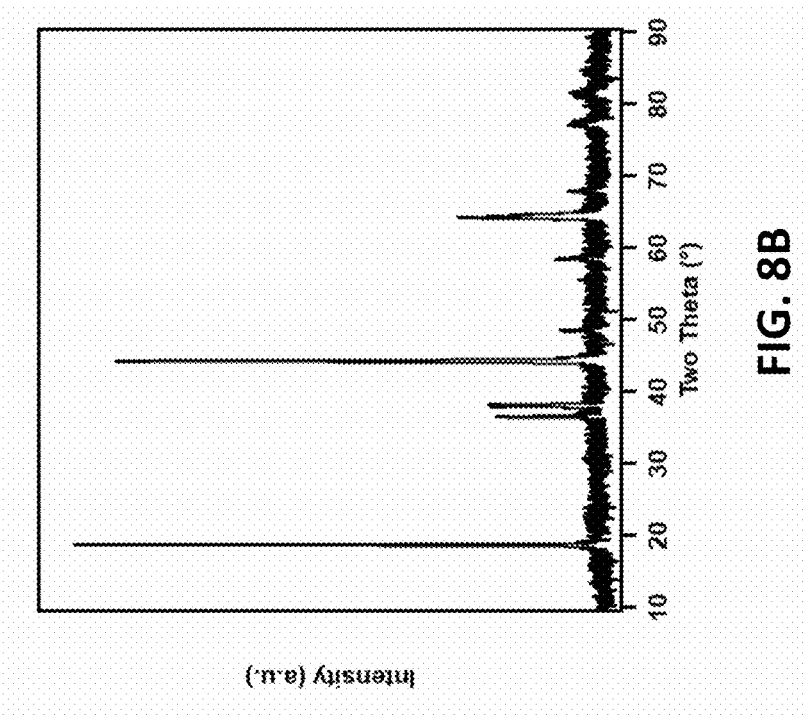
FIG. 8B is the XRD pattern of $LiNi_{0.75}Mn_{0.1}Co_{0.1}Al_{0.05}O_2$ 820 synthesized using the one-pot method.
Figure 8A:
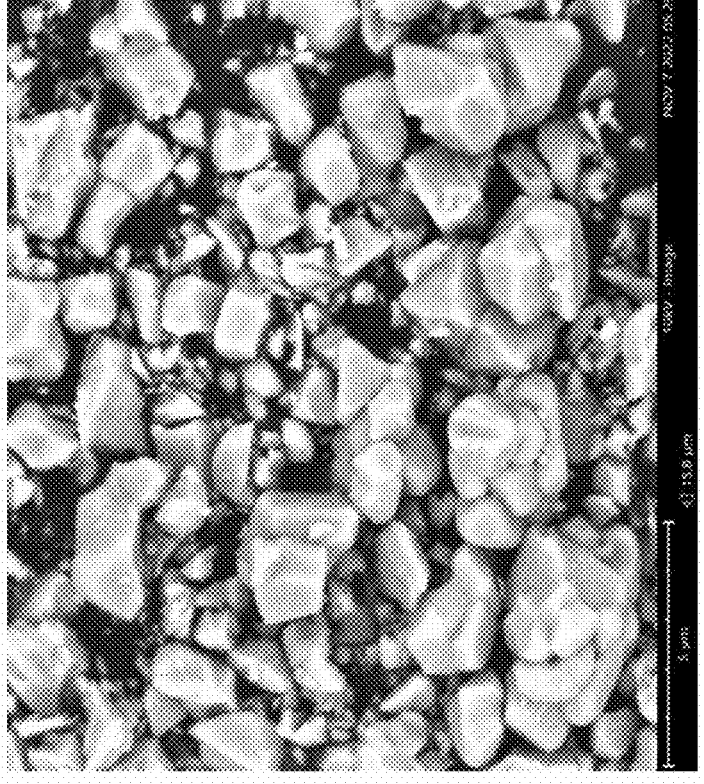
FIG. 8A is an SEM of particles of $LiNi_{0.75}Mn_{0.1}Co_{0.1}Al_{0.05}O_2$ 820 synthesized using the one-pot method.

FIG. 8B is the XRD pattern of $LiNi_{0.75}Mn_{0.1}Co_{0.1}Al_{0.05}O_2$ 820 synthesized using the one-pot method 200. Pure phase $LiNi_{0.75}Mn_{0.1}Co_{0.1}Al_{0.05}O_2$ was formed.

Figure 9A:
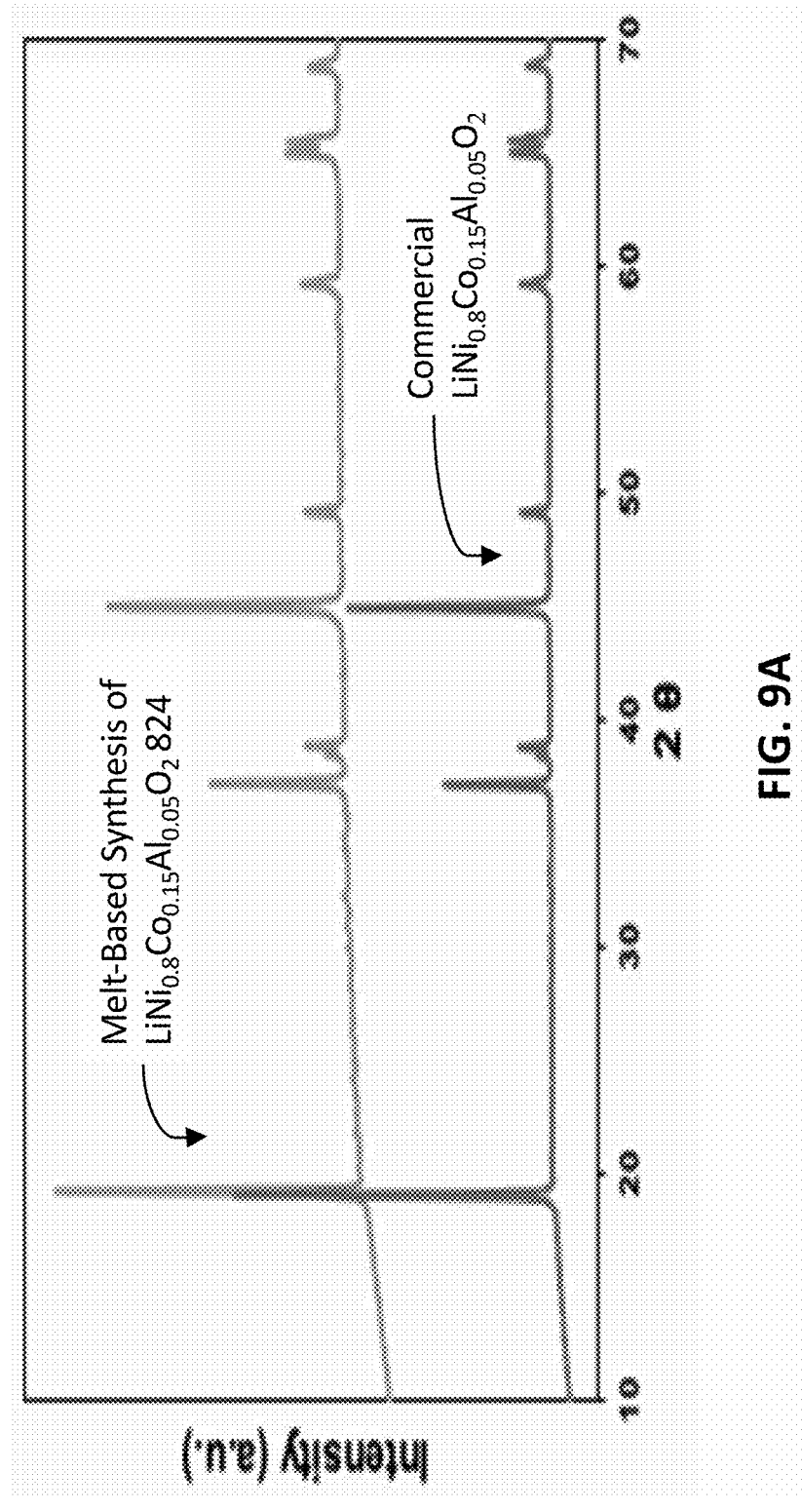
FIG. 9A is the XRD pattern for $LiNi_{0.8}Co_{0.15}Al_{0.05}O_2$ 824 and for commercially available $LiNi_{0.8}Co_{0.15}Al_{0.05}O_2$ using the melt-based one-pot method 100.

The Ni content was further increased using the method 100. FIG. 9A is the XRD pattern for $LiNi_{0.8}Co_{0.15}Al_{0.05}O_2$ 824 and for commercially available $LiNi_{0.8}Co_{0.15}Al_{0.05}O_2$ using the melt-based one-pot method 100. The XRD patterns show pure phase material and are nearly identical for both cathodes.

Figure 9B:
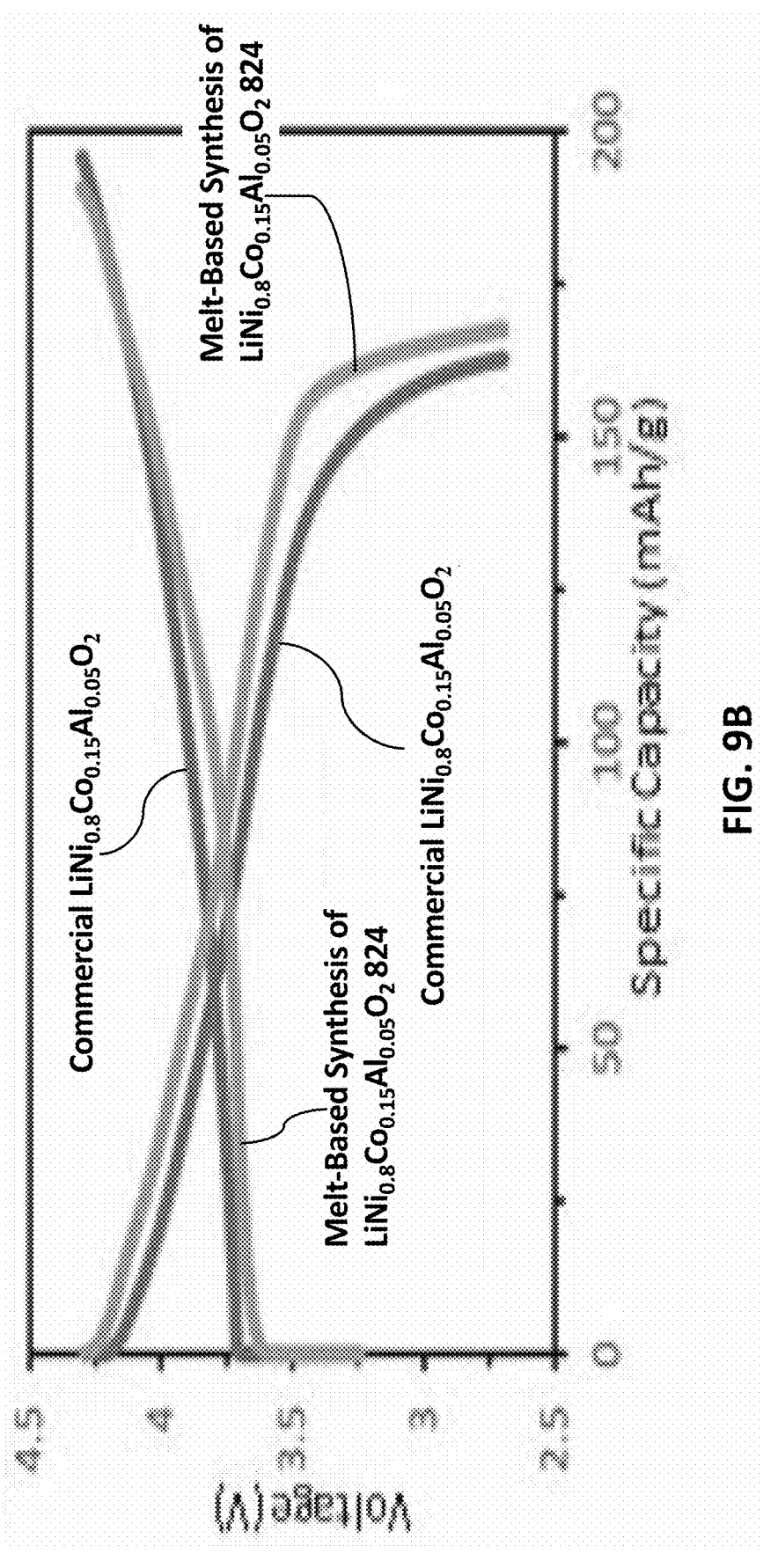
FIG. 9B is specific capacity plot of $LiNi_{0.8}Co_{0.15}Al_{0.05}O_2$ 824 and commercially available $LiNi_{0.8}Co_{0.15}Al_{0.05}O_2$ using the melt-based one-pot method.

FIG. 9B is specific capacity plot of $LiNi_{0.8}Co_{0.15}Al_{0.05}O_2$ 824 and commercially available $LiNi_{0.8}Co_{0.15}Al_{0.05}O_2$ using the melt-based one-pot method 100. A slight increase in charge capacity is observed for the commercially available $LiNi_{0.8}Co_{0.15}Al_{0.05}O_2$ while the synthesized cathode $LiNi_{0.8}Co_{0.15}Al_{0.05}O_2$ 824 exhibits a slight increase in discharge capacity.

A slightly different method was explored for $LiNi_{0.8}Co_{0.15}Al_{0.05}O_2$ 824. FIG. 10A is an SEM of particles of $LiNi_{0.8}Co_{0.15}Al_{0.05}O_2$ 828 synthesized using the melt-based one-pot method 100. After heating to 350° C., the powder was cooled then ground then reheated to a higher temperatures and held at 500° C. then 800° C. whereas for $LiNi_{0.8}Co_{0.15}Al_{0.05}O_2$ 824 there was no cooling after 350° C.

Figure 10B:
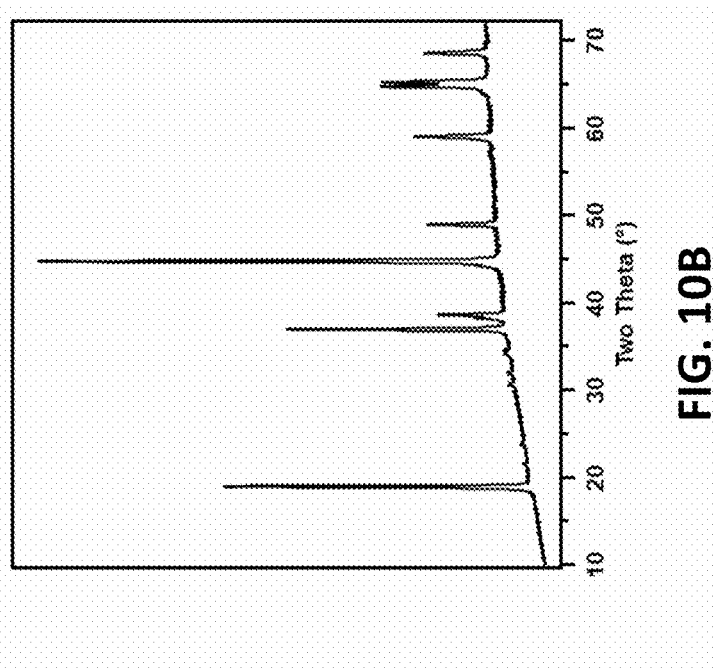
FIG. 10B is the XRD pattern for $LiNi_{0.8}Co_{0.15}Al_{0.05}O_2$ 828 using the melt-based one-pot method.
Figure 10A:
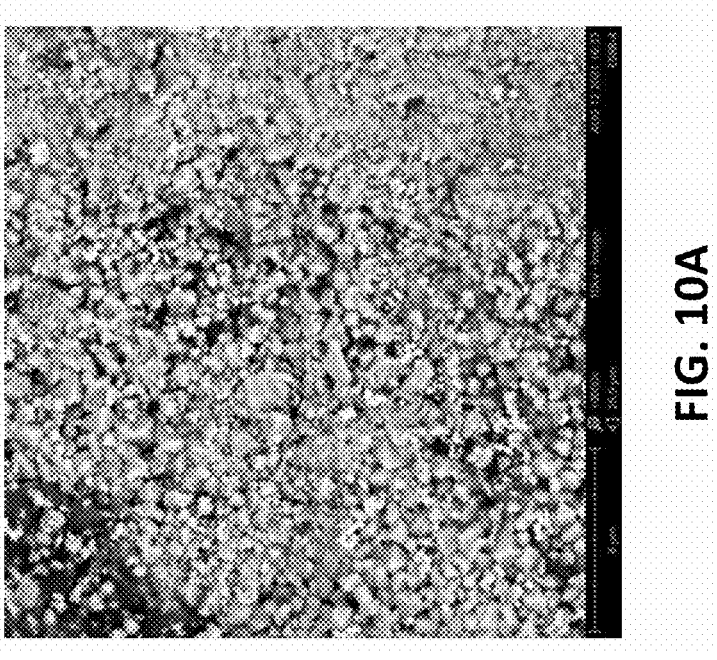
FIG. 10A is an SEM of particles of $LiNi_{0.8}Co_{0.15}Al_{0.05}O_2$ 828 synthesized using the melt-based one-pot method.

FIG. 10B is the XRD pattern for $LiNi_{0.8}Co_{0.15}Al_{0.05}O_2$ 828 using the melt-based one-pot method 100. Pure phase $LiNi_{0.8}Co_{0.15}Al_{0.05}O_2$ was formed.

Synthesis of $LiNi_{0.8}Mn_{0.1}Co_{0.1}O_2$ with Varying Organic Acid:Metal Ratios A series of experiments was carried out using one-pot method 200 but with multiple metals while varying the organic acid content. This is to better understand the role the organic acid plays in forming pure phase $LiNi_{0.8}Mn_{0.1}Co_{0.1}O_2$ (i.e., NMC811). The organic acid was varied with respect to the total moles of transition metal used. The typical method used is using a 1:1 ratio of organic acid to metal content. The following oxalic acid to metal ratios were investigated: 1:1, 0.5:1, 0.25:1, 0.1:1, 0.05:1, 0.025:1, 0.01:1 and no oxalic acid.

Figures 11A, 11B, 11C:
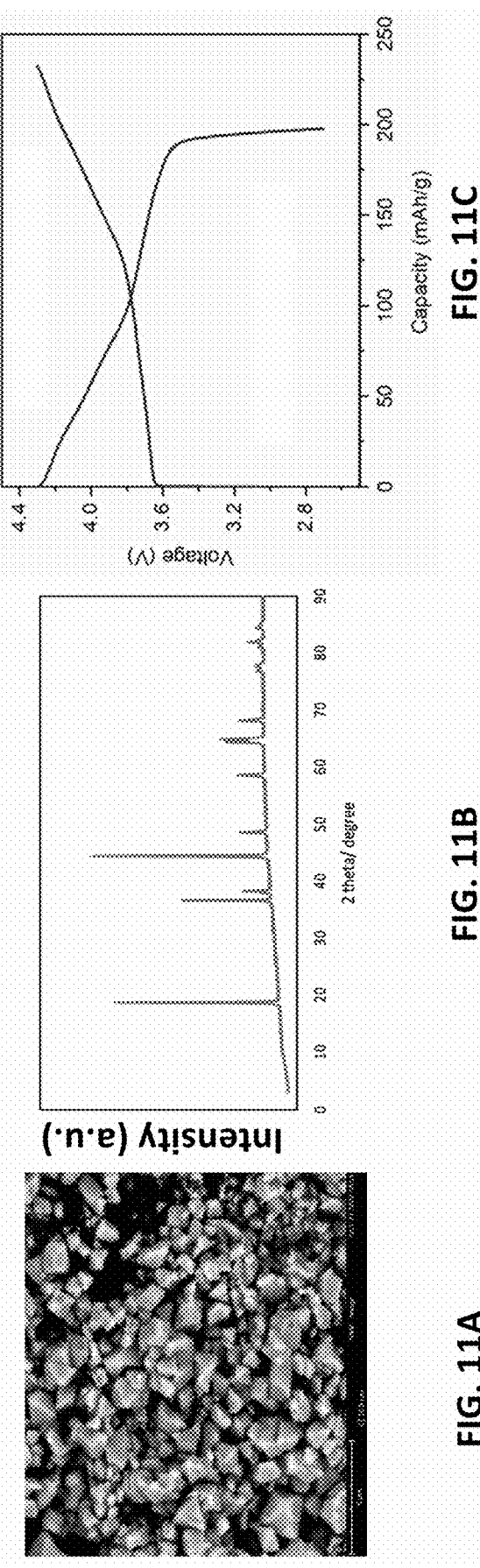
FIG. 11A is an SEM of particles of $LiNi_{0.8}Mn_{0.1}Co_{0.1}O_2$ 832 synthesized using the one-pot method with 1:1 oxalic acid.
FIG. 11B is the XRD pattern of $LiNi_{0.8}Mn_{0.1}Co_{0.1}O_2$ 832 synthesized using the one-pot method with 1:1 oxalic acid.
FIG. 11C is a plot of the first charge and discharge of $LiNi_{0.8}Mn_{0.1}Co_{0.1}O_2$ 832 synthesized using the one-pot method with 1:1 oxalic acid.

FIG. 11A is an SEM of particles of $LiNi_{0.8}Mn_{0.1}Co_{0.1}O_2$ 832 synthesized using the one-pot method 200 with 1:1 oxalic acid. Non-agglomerated single crystals were formed.

FIG. 11B is the XRD pattern of $LiNi_{0.8}Mn_{0.1}Co_{0.1}O_2$ 832 synthesized using the one-pot method 200 with 1:1 oxalic acid. Pure phase $LiNi_{0.8}Mn_{0.1}Co_{0.1}O_2$ were formed.

FIG. 11C is a plot of the first charge and discharge of $LiNi_{0.8}Mn_{0.1}Co_{0.1}O_2$ 832 synthesized using the one-pot method 200 with 1:1 oxalic acid. The 0.1 C first charge capacity was 232.2 mAh/g and the 0.1 C first discharge capacity was 197.7 mAh/g with a first discharge efficiency of about 85.1%.

Figures 12A, 12B, 12C, 12D, 12E, 12F:
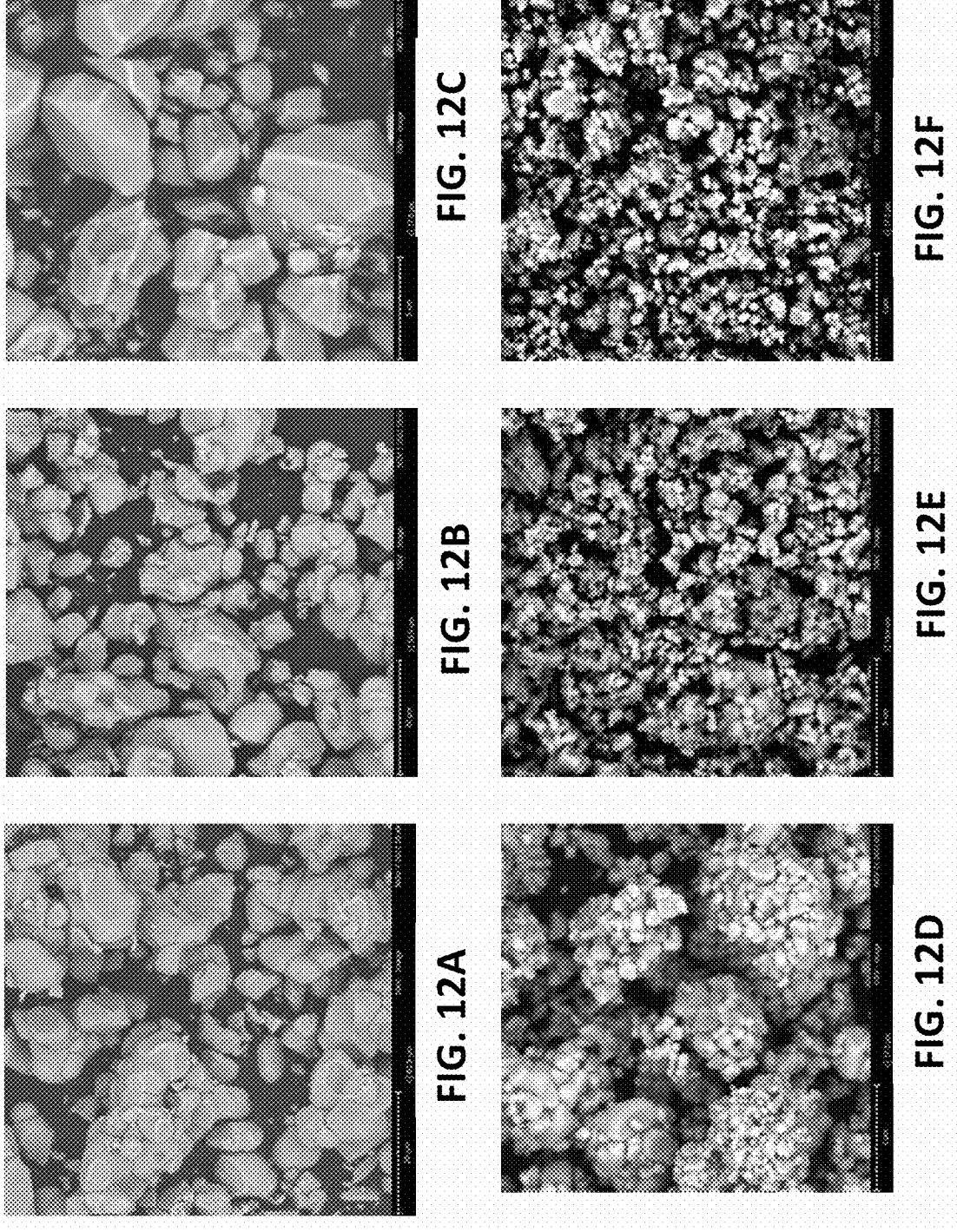
FIG. 12A is an SEM of particles of $LiNi_{0.8}Mn_{0.1}Co_{0.1}O_2$ 836 synthesized using the one-pot method with 0.5:1 oxalic acid:metal ratio.
FIG. 12B is an SEM of particles of $LiNi_{0.8}Mn_{0.1}Co_{0.1}O_2$ 840 synthesized using the one-pot method using a 0.25:1 oxalic acid:metal ratio.
FIG. 12C is an SEM of particles of $LiNi_{0.8}Mn_{0.1}Co_{0.1}O_2$ 844 synthesized using the one-pot method using a 0.1:1 oxalic acid:metal ratio.
FIG. 12D is an SEM of particles of $LiNi_{0.8}Mn_{0.1}Co_{0.1}O_2$ 848 synthesized using the one-pot method using a 0.05:1 oxalic acid:metal ratio.
FIG. 12E is an SEM of particles of $LiNi_{0.8}Mn_{0.1}Co_{0.1}O_2$ 856 synthesized using the one-pot method using a 0.01:1 oxalic acid:metal ratio.
FIG. 12F is an SEM of particles of $LiNi_{0.8}Mn_{0.1}Co_{0.1}O_2$ 860 synthesized using the one-pot method using no oxalic acid.

FIG. 12A is an SEM of particles of $LiNi_{0.8}Mn_{0.1}Co_{0.1}O_2$ 836 synthesized using the one-pot method 200 with 0.5:1 oxalic acid:metal ratio. FIG. 12B is $LiNi_{0.8}Mn_{0.1}Co_{0.1}O_2$ 840 using a 0.25:1 oxalic acid:metal ratio, FIG. 12C is $LiNi_{0.8}Mn_{0.1}Co_{0.1}O_2$ 844 using a 0.1:1 oxalic acid:metal ratio, FIG. 12D is $LiNi_{0.8}Mn_{0.1}Co_{0.1}O_2$ 848 using a 0.05:1 oxalic acid:metal ratio, FIG. 12E is $LiNi_{0.8}Mn_{0.1}Co_{0.1}O_2$ 856 using a 0.01:1 oxalic acid:metal ratio, and FIG. 12F is $LiNi_{0.8}Mn_{0.1}Co_{0.1}O_2$ 860 using no oxalic acid. Energy-dispersive X-ray spectroscopy (EDS) analysis showed even distribution of elements across sample across higher oxalic acid content samples while EDS showed clear uneven distribution of elements across sample in low oxalic acid content reactions. The particles also become smaller and less crystalline as the amount of oxalic acid used is decreased.

Figure 13:
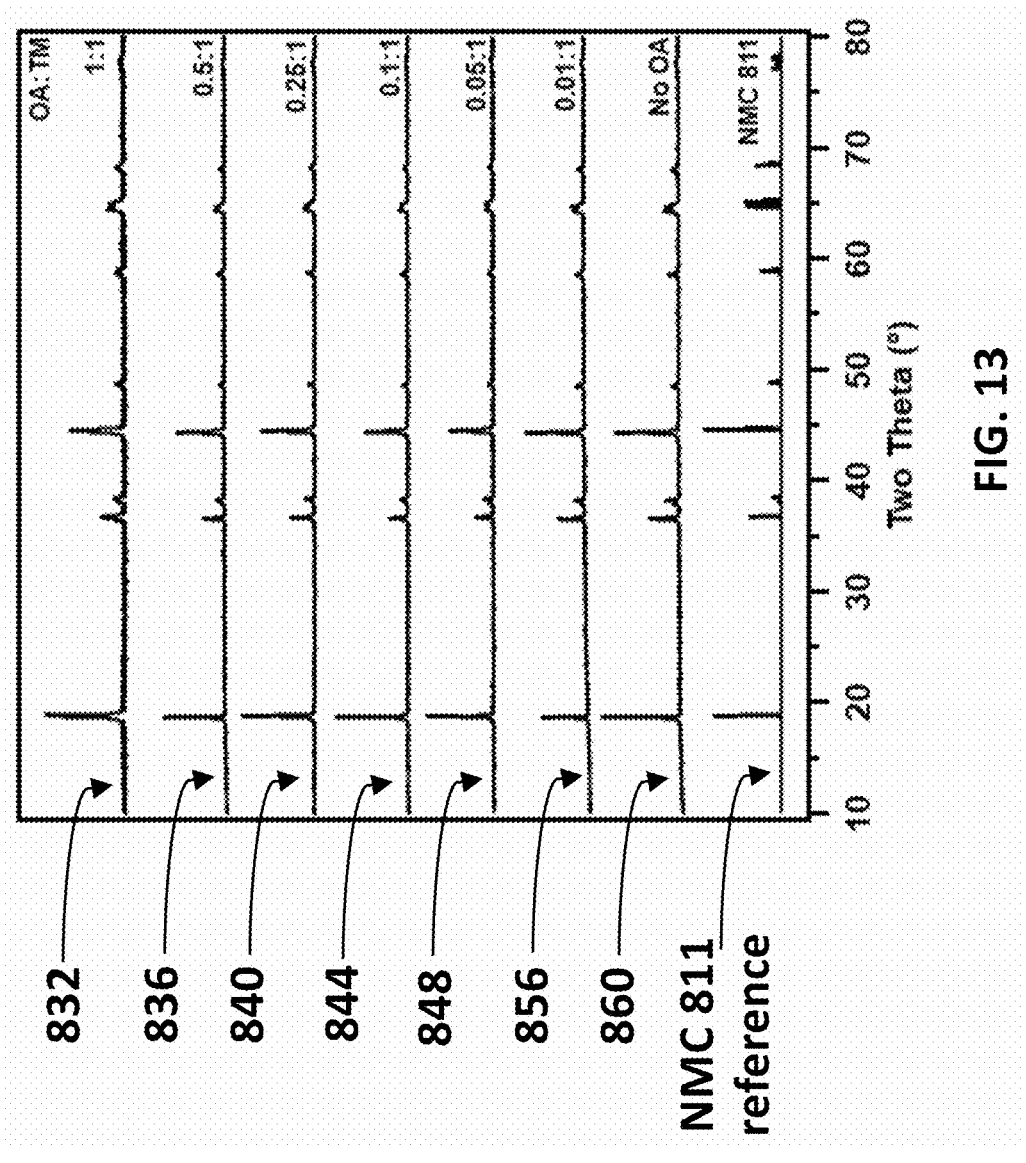
FIG. 13 is the XRD pattern for $LiNi_{0.8}Mn_{0.1}Co_{0.1}O_2$ cathode synthesized using the one-pot method with varying oxalic acid:metal ratio.

FIG. 13 is the XRD pattern for $LiNi_{0.8}Mn_{0.1}Co_{0.1}O_2$ cathodes synthesized using the one-pot method 200 with varying oxalic acid:metal ratio. In the range of about 1:1 to about 0.1:1 oxalic acid:metal, XRD shows pure phase $LiNi_{0.8}Mn_{0.1}Co_{0.1}O_2$ was formed. Below about 0.1:1 some of the peaks in the diffraction pattern disappear or have nearly disappeared indicating a non-pure phase was formed and further indicating the importance of the organic acid in the assembly of the pure phase cathode.

Synthesis of $LiNi_{0.8}Mn_{0.1}Co_{0.1}O_2$ with Nb and Zr Dopants

Figures 14A, 14B:
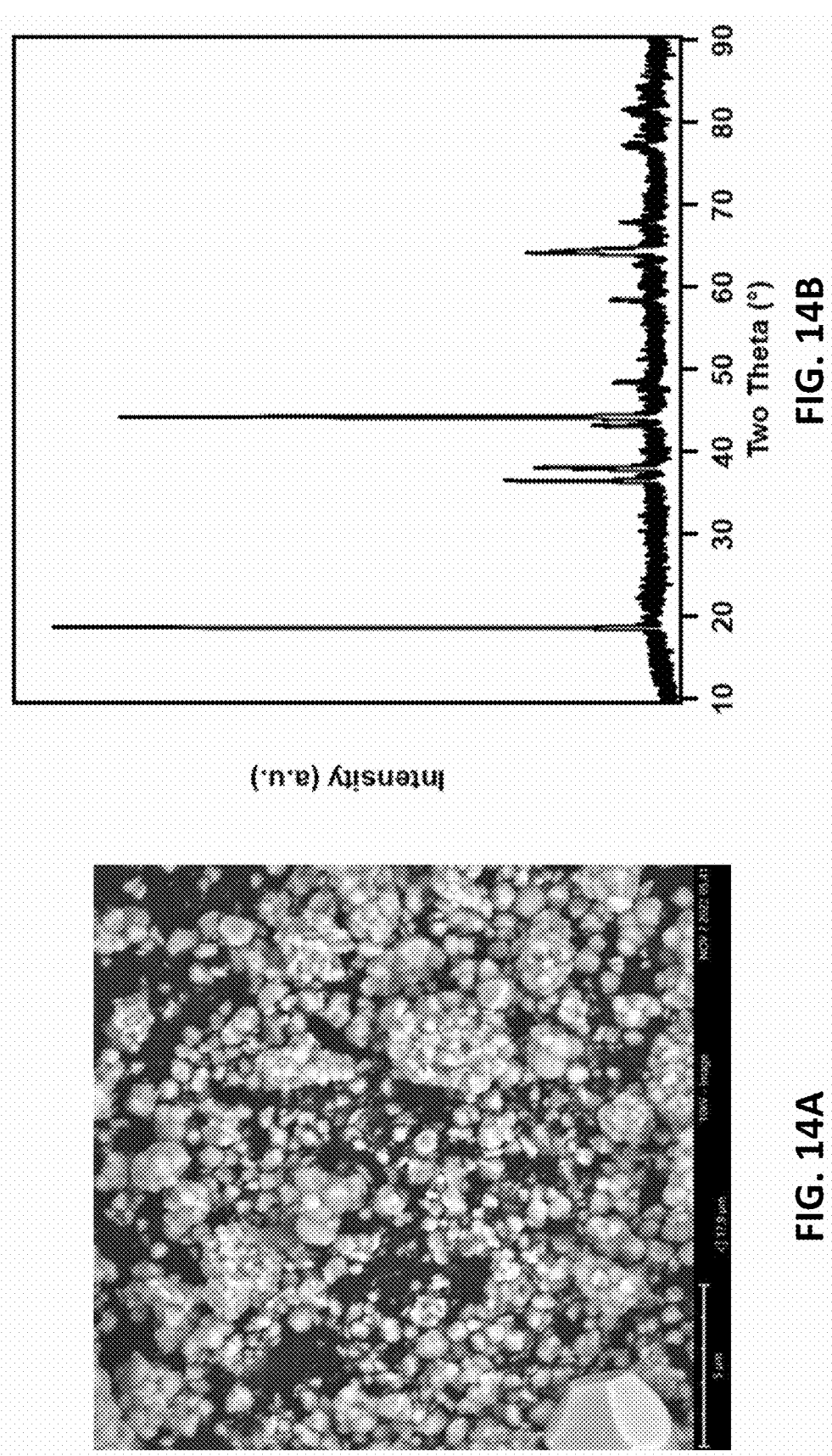
FIG. 14A is an SEM of particles of $LiNi_{0.8}Mn_{0.1}Co_{0.1}O_2$ 864 synthesized using the one-pot method and with Nb dopant.
FIG. 14B is the XRD pattern of $LiNi_{0.8}Mn_{0.1}Co_{0.1}O_2$ 864 synthesized using the one-pot method and with Nb dopant.

The organic acid-based method disclosed herein can also be used to form metal doped lithium metal and mixed metal oxides. Doped $LiNi_{0.8}Mn_{0.1}Co_{0.1}O_2$ was investigated by doping with Nb and Zr using the one-pot, organic acid method 200. FIG. 14A is an SEM of particles of $LiNi_{0.8}Mn_{0.1}Co_{0.1}O_2$ 864 and FIG. 14B is the XRD pattern of $LiNi_{0.8}Mn_{0.1}Co_{0.1}O_2$ 864 synthesized using the one-pot method 200 and with Nb dopant. The dopant reagent used was $Nb_2O_5$. Single crystals were formed and the XRD showed pure phase but some minor NiO impurity was found.

$LiNi_{0.8}Mn_{0.1}Co_{0.1}O_2$ was also doped with Zr using $Zr_2O_3$ reagent. FIG. 15A is an SEM of particles of $LiNi_{0.8}Mn_{0.1}Co_{0.1}O_2$ 868 synthesized using the one-pot method 200 and with Zr dopant. Single crystal particles were formed.

Figure 15B:
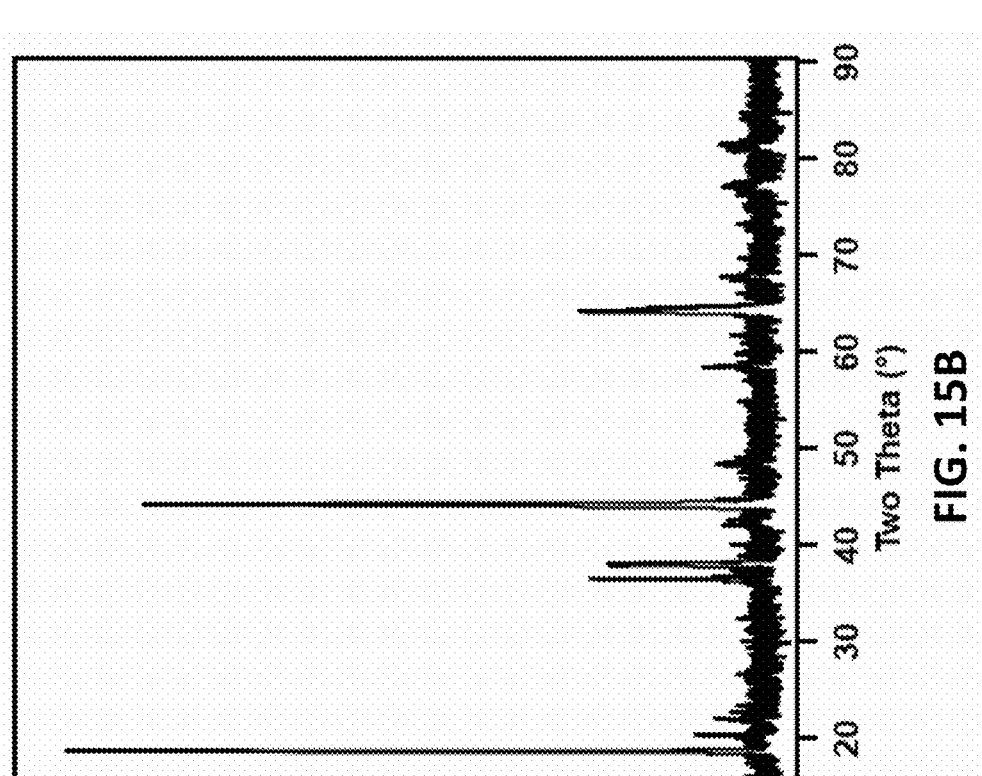
FIG. 15B is the XRD pattern of $LiNi_{0.8}Mn_{0.1}Co_{0.1}O_2$ 868 synthesized using the one-pot method and with Zr dopant.
Figure 15A:
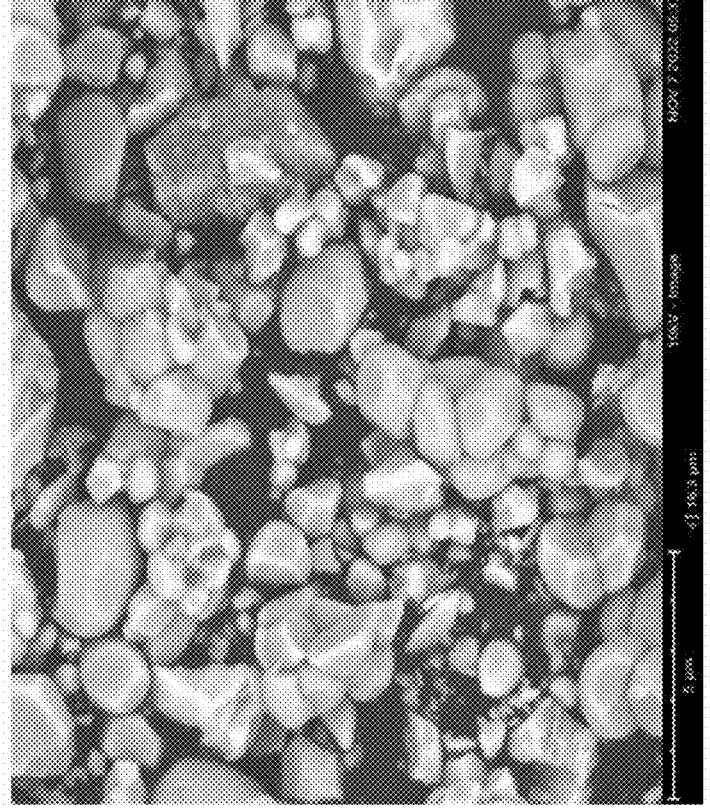
FIG. 15A is an SEM of particles of $LiNi_{0.8}Mn_{0.1}Co_{0.1}O_2$ 868 synthesized using the one-pot method and with Zr dopant.

FIG. 15B is the XRD pattern of $LiNi_{0.8}Mn_{0.1}Co_{0.1}O_2$ 868 synthesized using the one-pot method 200 and with Zr dopant. Pure phase $LiNi_{0.8}Mn_{0.1}Co_{0.1}O_2$ was observed but a minor amount of $Li_2ZrO_3$ impurity was detected.

Ultra-High Ni Content $LiNi_{0.9}Mn_{0.05}M_{0.05}O_2$

Figures 16A, 16B:
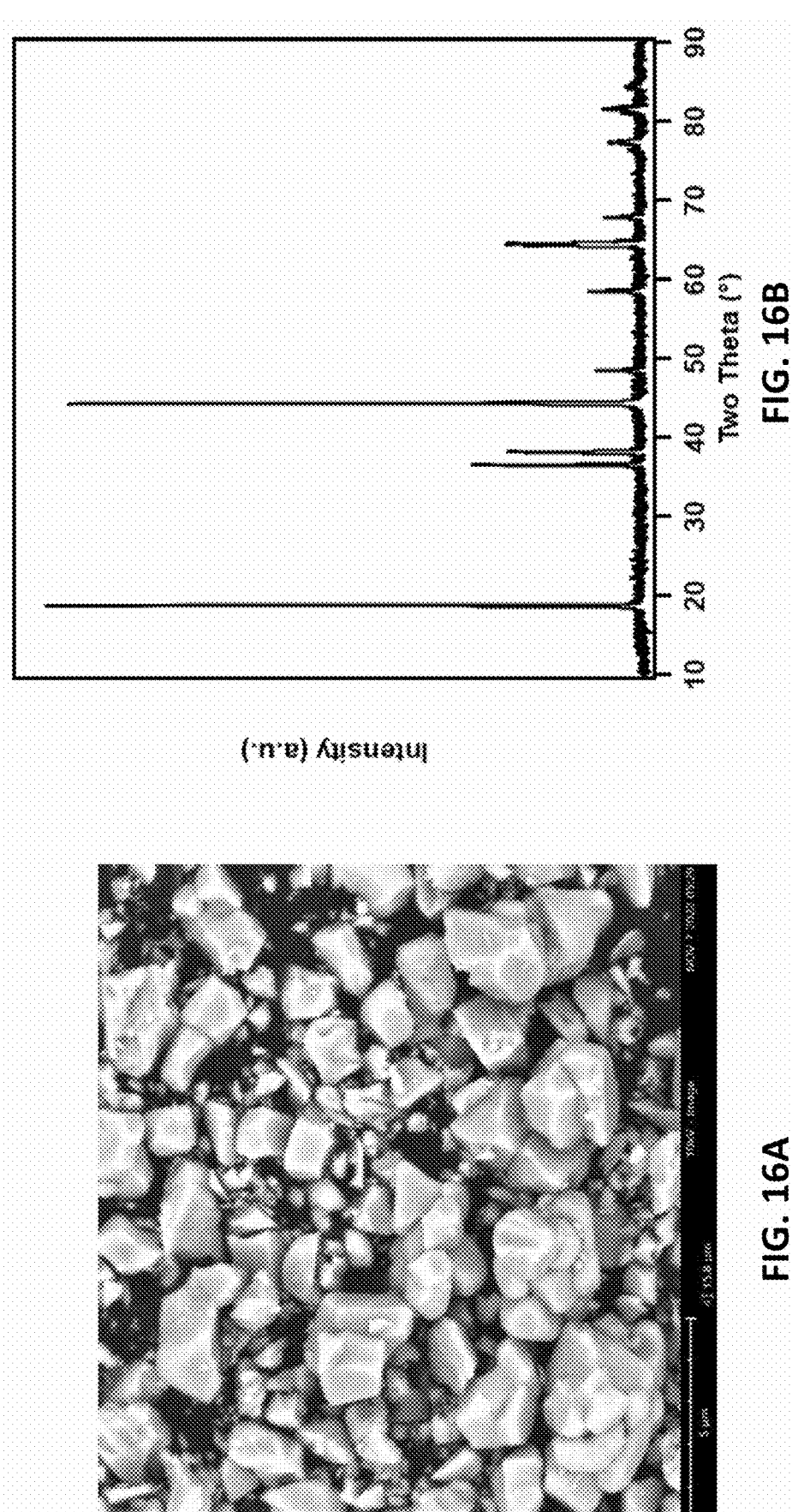
FIG. 16A is an SEM of particles of $LiNi_{0.9}Mn_{0.05}Co_{0.05}O_2$ 872 synthesized using the one-pot method.
FIG. 16B is the XRD pattern of $LiNi_{0.9}Mn_{0.05}Co_{0.05}O_2$ 872 synthesized using the one-pot method.

An even higher Ni content was synthesized using an organic acid-based method disclosed herein to form oxides with the formula $LiNi_{0.9}Mn_{0.05}M_{0.05}O_2$ where M=Co or Al. Method 200 was used with multiple metal compounds used in the synthesis. FIG. 16A is an SEM of particles of $LiNi_{0.9}Mn_{0.05}Co_{0.05}O_2$ 872 synthesized using the one-pot method 200. Single crystal primary particles were formed.

FIG. 16B is the XRD pattern of $LiNi_{0.9}Mn_{0.05}Co_{0.05}O_2$ 872 synthesized using the one-pot method 200. Pure phase $LiNi_{0.9}Mn_{0.05}Co_{0.05}O2$ was found and no other crystalline impurities were observed.

Figures 17A, 17B:
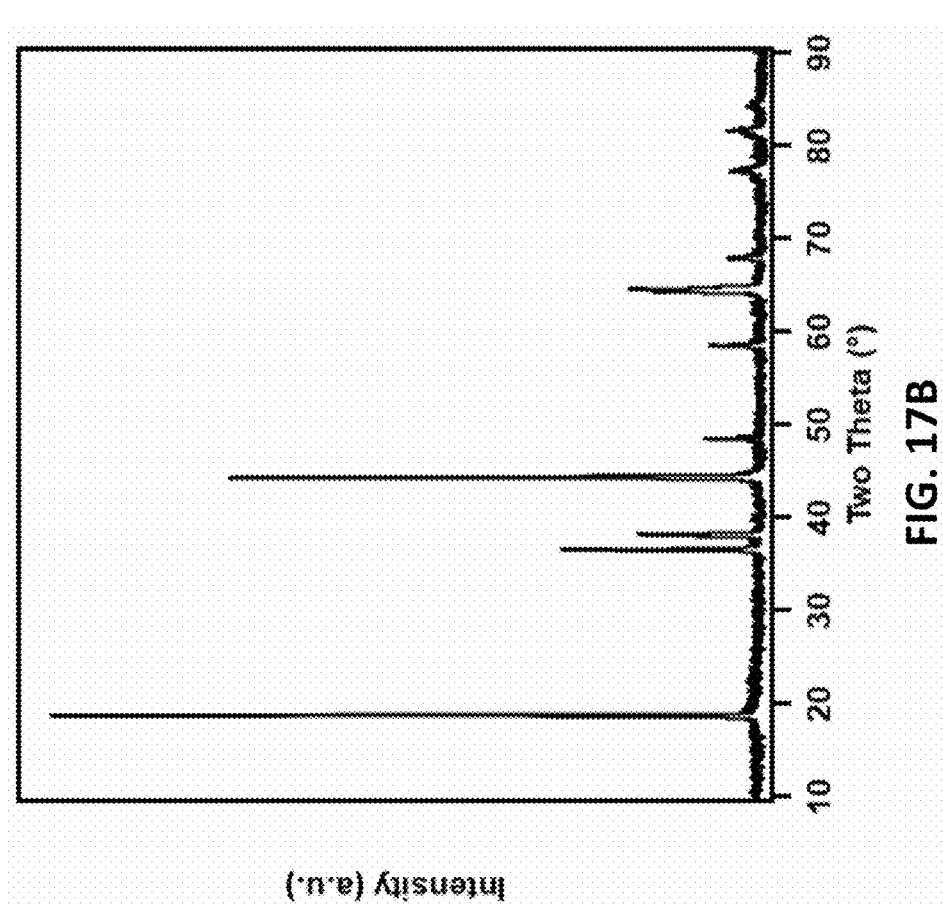
FIG. 17A is an SEM of particles of $LiNi_{0.9}Mn_{0.05}Al_{0.05}O_2$ 876 synthesized using the one-pot method.
FIG. 17B is the XRD pattern of $LiNi_{0.9}Mn_{0.05}Al_{0.05}O_2$ 876 synthesized using the one-pot method.

FIG. 17A is an SEM of particles of $LiNi_{0.9}Mn_{0.05}Al_{0.05}O_2$ 876 and FIG. 17B is the XRD pattern of $LiNi_{0.9}Mn_{0.05}Al_{0.05}O_2$ 876 synthesized using the one-pot method 200. In this material, Al was substituted for Co. Non-agglomerated single crystal particles were observed. XRD showed pure phase of $LiNi_{0.9}Mn_{0.05}Al_{0.05}O_2$ was formed.

Lithium Metal Phosphates

The following embodiments relate to a method to manufacture a metal phosphate, in particular a lithium metal phosphate.

Figure 18:
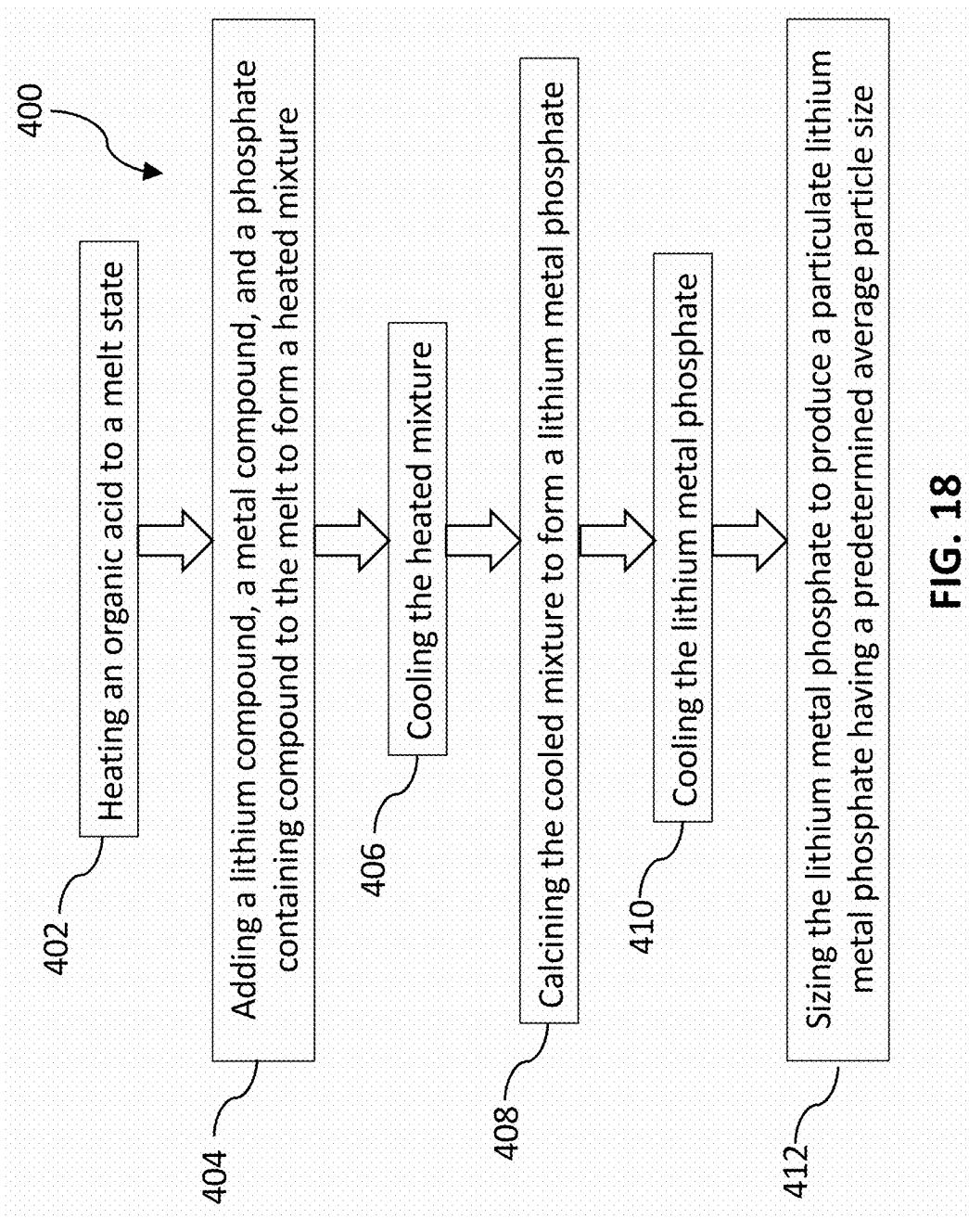
FIG. 18 is a block diagram of a melt-based method to manufacture a particulate lithium metal phosphate, according to an embodiment of the disclosure.

FIG. 18 is a block diagram of a melt-based method 400 to manufacture a particulate lithium metal phosphate, according to an embodiment of the disclosure. The method of manufacture of lithium metal phosphate is similar to that of method 100 disclosed herein for the synthesis of lithium metal oxides. An organic acid is first heated to a melt state 402. Once the melt state is reached, a lithium compound, a metal compound, and a phosphate compound are added to the melt to form a heated mixture 404. The phosphate containing compound may be selected from the group consisting of $(NH_4)_3PO_4$, $H_3PO_4$, $Na_3PO_4$, $Li_3PO_4$, $K_3PO_4$, $H(NH_4)_2PO_4$, and $H_2(NH_4)PO_4$.

The heated mixture is stirred continuously and after a period of time, the heated mixture is cooled 406. The cooled mixture is then calcined to form a lithium metal phosphate 408. The lithium metal phosphate is cooled to form a lithium metal phosphate 410 with general formula $Li(M5)PO_4$, where M5 is of iron, nickel, manganese, or cobalt. The lithium metal phosphate may then be sized to produce a particulate lithium metal phosphate having a predetermined average particle size 412 that is suitable for use in a lithium-ion battery cell.

In some embodiments, step 406 may be eliminated such that there is no intermediate cooling and grinding step such that the heated mixture in step 404 is then calcined to a high temperature to form the lithium metal phosphate.

In step 404, two or more metal compounds may be added with different metals to form a lithium mixed metal phosphate with general formula $Li(M5)_a(M6)_bPO_4$ where a+b=1, $Li(M5)_a(M6)_b(M7)_cPO4$ where a+b+c=1, or $Li(M5)_a(M6)_b(M7)_c(M8)_dPO4$ where a+b+c+d=1, and where M5, M6, M7, and M8 are selected from the group consisting of iron, nickel, manganese, and cobalt. The lithium metal phosphate or lithium mixed metal phosphate may be doped, such as for example, a transition metal. The dopant may be selected from the group consisting of Al, Ti, Zr, Mg, B, F, W, Mo, V, Ta, Ga, Nb, Zn, Cs, and Ca.

FIG. 19 is a block diagram of a one-pot method to 500 manufacture a particulate lithium metal phosphate, according to an embodiment of the disclosure. The method of manufacture of lithium metal phosphate is similar to that of method 200 disclosed herein for the synthesis of lithium metal oxides or lithium mixed metal oxides. An organic acid, a lithium compound, a metal compound, and a phosphate containing compound are combined to form a mixture 502. Two or more metal compounds may be added in step 502 if desired to form a mixed metal phosphate.

The mixture is ground and calcined to form a calcined mixture 504. The calcined mixture is cooled 506 then reground and calcined again to form a lithium metal phosphate 508. The lithium metal phosphate is then cooled to room temperature 510. The lithium metal phosphate is sized to produce a particulate lithium metal phosphate having a predetermined average particle size 512.

In some embodiments, step 506 may be eliminated such that there is no intermediate cooling and grinding step such that the mixture formed in step 502 is then calcined to a high temperature to form the lithium metal phosphate.

Figures 20A, 20B, 20C:
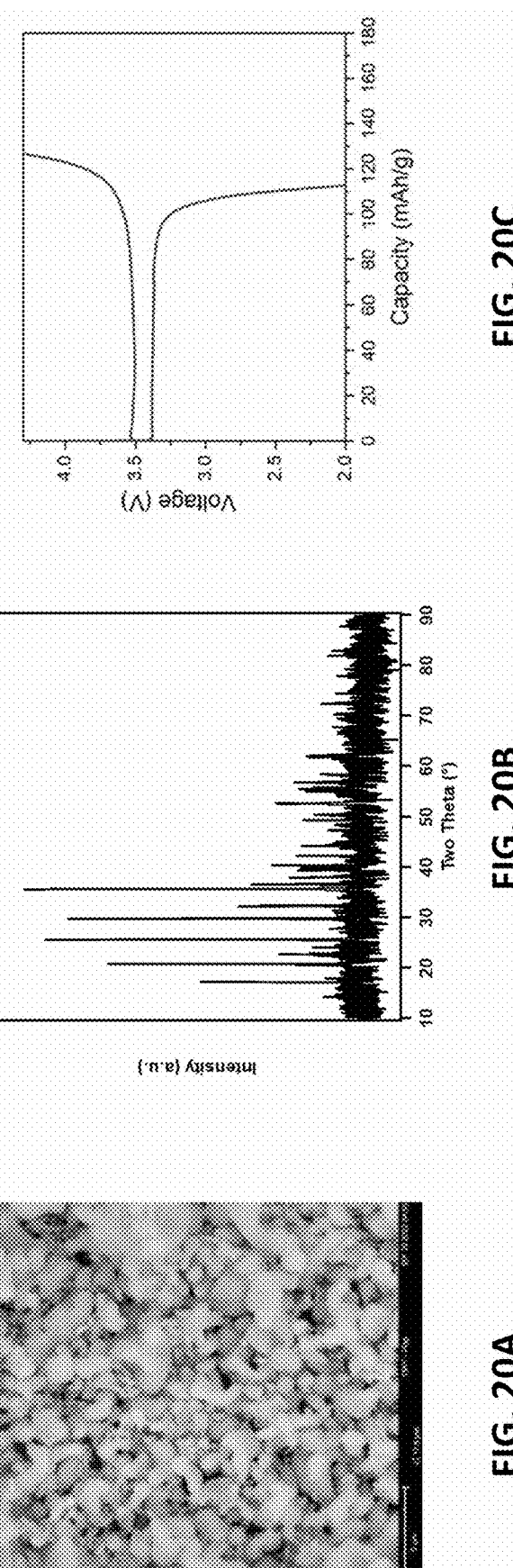
FIG. 20A is an SEM of particles of $LiFePO_4$ 880 synthesized using one-pot method 500.
FIG. 20B is the XRD pattern of $LiFePO_4$ 880 synthesized using one-pot method.
FIG. 20C is a plot of the first charge and discharge of $LiFePO_4$ 880 synthesized using one-pot method.

FIG. 20A is an SEM of particles of $LiFePO_4$ 880, FIG. 20B is the XRD pattern of $LiFePO_4$ 880 and FIG. 20C is a plot of the first charge and discharge of $LiFePO_4$ 880 synthesized using one-pot method 500. The SEM shows single crystalline particles of $LiFePO_4$ were formed. XRD shows the pure phase of $LiFePO_4$ was formed.

Increasing Particle Size in $LiNi_{0.8}Mn_{0.1}Co_{0.1}O_2$ by Heat Treatment

Heat treatment was investigated as a method to increase the particle size in a single crystalline sample of $LiNi_{0.8}Mn_{0.1}Co_{0.1}O_2$ particles that were synthesized using the procedure for $LiNi_{0.8}Mn_{0.1}Co_{0.1}O_2$ 832 disclosed herein. A sample of $LiNi_{0.8}Mn_{0.1}Co_{0.1}O_2$ 884 particles was synthesized then ground in a planetary ball mill over a period of about 0.5-1.5 h to yield a black powder with average single crystal size of about 0.5-1 micron. The milled sample was then heated under a flow of oxygen (1-3 L/min) to about 900-1000° C. at a rate of about 1-20° C./min and held for 10-20 h. The sample was cooled to room temperature to yield a black powder of $LiNi_{0.8}Mn_{0.1}Co_{0.1}O_2$ 888 and ground. SEM and XRD analysis was performed on the $LiNi_{0.8}Mn_{0.1}Co_{0.1}O_2$ samples before and after heat treatment. The particle size was increased dramatically and the heat treatment did not affect the phase or purity of the final $LiNi_{0.8}Mn_{0.1}Co_{0.1}O_2$ particles.

FIG. 21A is an SEM of ground particles of $LiNi_{0.8}Mn_{0.1}Co_{0.1}O_2$ 884 before heat treatment and FIG. 21B is an SEM of ground particles of $LiNi_{0.8}Mn_{0.1}Co_{0.1}O_2$ 888 after heat treatment. The magnification was the same used in each SEM. The $LiNi_{0.8}Mn_{0.1}Co_{0.1}O_2$ 884 particles were on average about 0.5-1 micron in size. After heat treatment, the $LiNi_{0.8}Mn_{0.1}Co_{0.1}O_2$ 888 particles were about 3-6 microns in average size. The $LiNi_{0.8}Mn_{0.1}Co_{0.1}O_2$ 888 material was a noticeably more coarse powder after heat treatment and grinding with a mortar and pestle.

Figure 22:
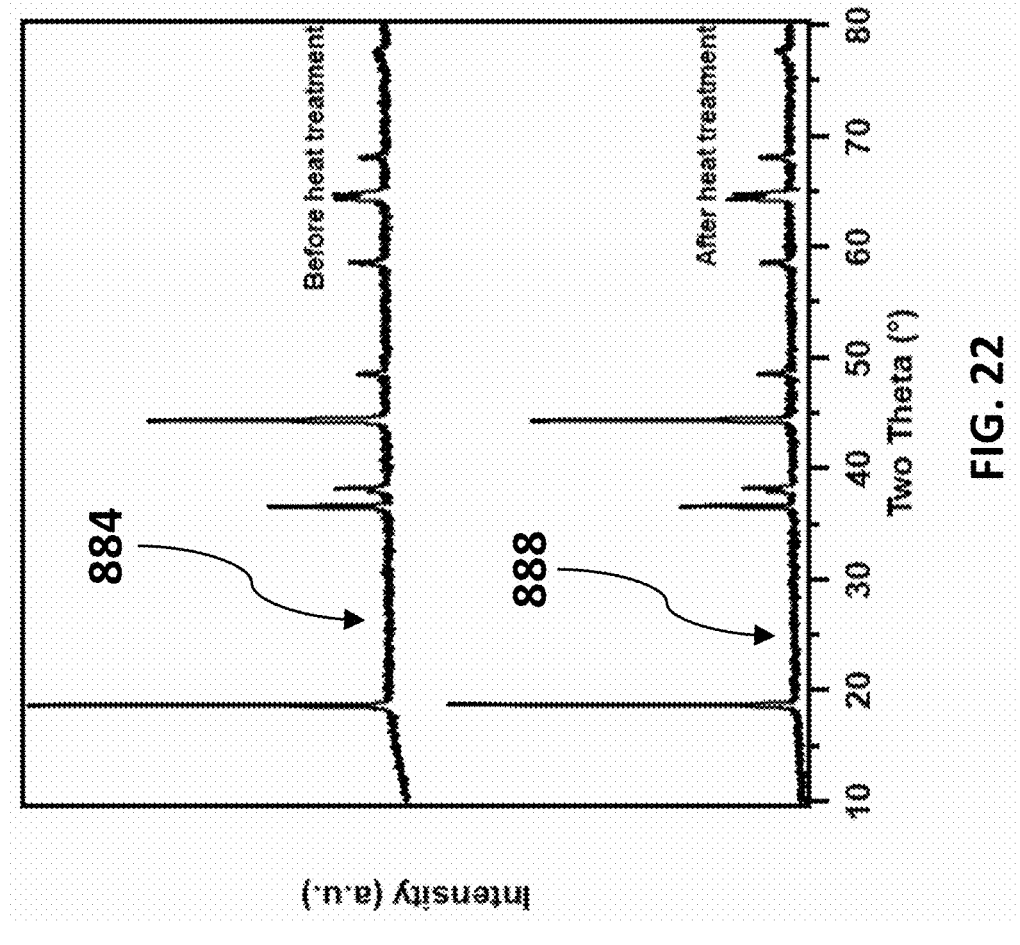
FIG. 22 is an XRD pattern of ground particles of $LiNi_{0.8}Mn_{0.1}Co_{0.1}O_2$ before 884 and after 888 heat treatment.

FIG. 22 is an XRD pattern of ground particles of $LiNi_{0.8}Mn_{0.1}Co_{0.1}O_2$ before 884 and after 888 heat treatment. The XRD shows no change in phase or purity in $LiNi_{0.8}Mn_{0.1}Co_{0.1}O_2$ before and after heat treatment.

Recycling of $LiNi_xMn_yCo_zO_2$ Using the Organic Acid-Based Method

The organic acid-based synthetic method disclosed may also be used to synthesize freshly made $LiNi_xMn_yCo_zO_2$-based cathode materials from used and recycled $LiNi_xMn_y-Co_zO_2$-based cathode materials. Recycling of cathode materials can aid in keeping the cost of manufacturing of cathode materials down along with resulting battery and electric car prices. Cheaper electric car prices may lead to further public adoption. A sample of recycled $LiNi_{0.33}Mn_{0.33}Co_{0.33}O_2$ (NMC111) in the form of NMC111 carbonate was obtained and used in the synthesis of $LiNi_xMn_yCo_zO_2$ freshly made cathodes with stoichiometries of $LiNi_{0.33}Mn_{0.33}Co_{0.33}O_2$ 892, $LiNi_{0.6}Mn_{0.2}Co_{0.2}O_2$ 892, and $LiNi_{0.8}Mn_{0.1}Co_{0.1}O_2$ 900. ICP analysis of the NMC111 carbonate after dissolving in 5M sulfuric acid and 10×dilution showed no Li, 29.1% Mn, 32.5% Ni and 34.0% Co. Trace impurities such as Na and Ca were also present. Organic acid to total metals content ratios used were in the range of about 0.5-3:1 organic acid:metal ratios. Lithium to metals content ratios used were in the range of about 1-2:1 Li:metal ratios.

Figures 23A, 23B:
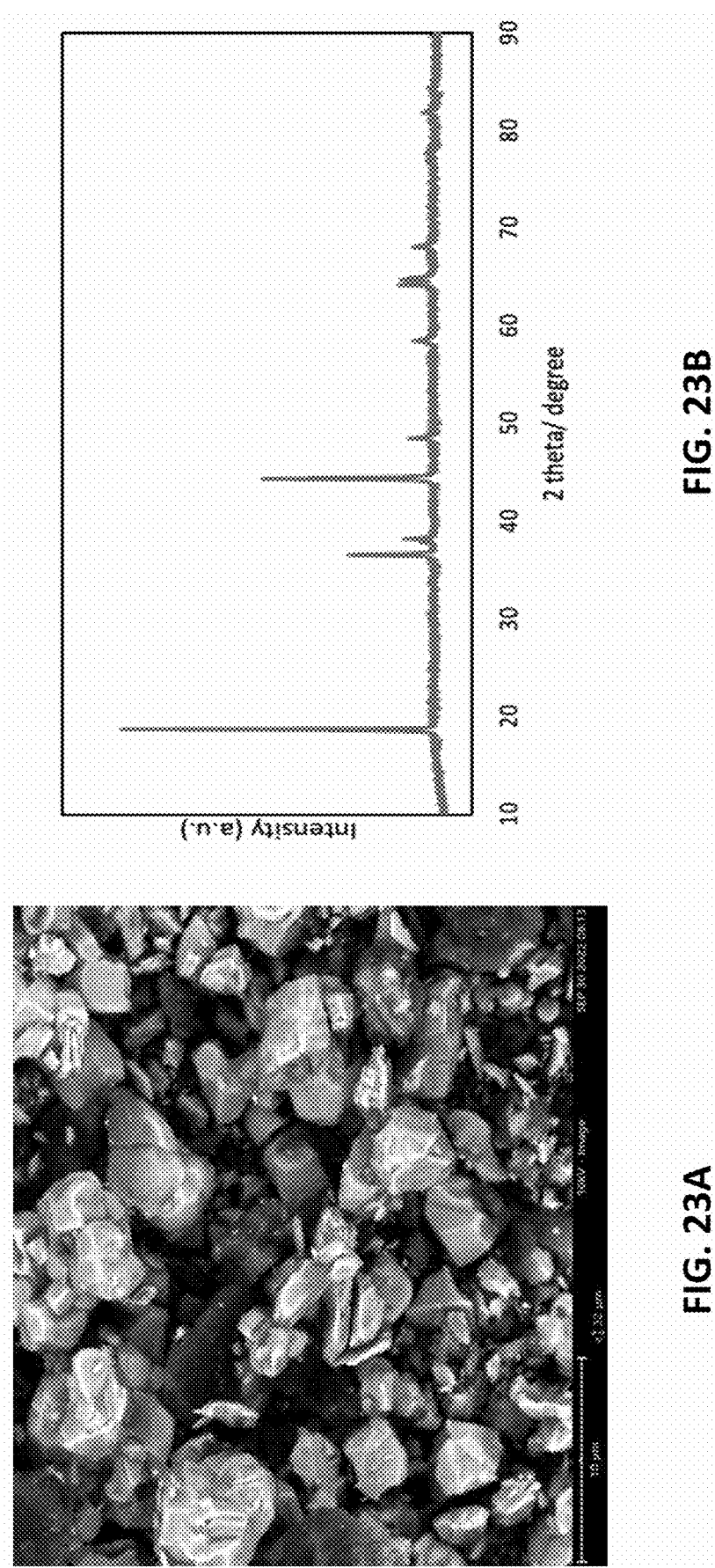
FIG. 23A is an SEM of $LiNi_{0.33}Mn_{0.33}Co_{0.33}O_2$ 892 made from recycled $LiNi_{0.33}Mn_{0.33}Co_{0.33}O_2$.
FIG. 23B is an XRD pattern of $LiNi_{0.33}Mn_{0.33}Co_{0.33}O_2$ 892 made from recycled $LiNi_{0.33}Mn_{0.33}Co_{0.33}O_2$.

FIG. 23A is an SEM and FIG. 23B is an XRD pattern of $LiNi_{0.33}Mn_{0.33}Co_{0.33}O_2$ 892 made from recycled $LiNi_{0.33}Mn_{0.33}Co_{0.33}O_2$. Single particles were made with average size in the range of about 2-4 micron. XRD showed pure phase $LiNi_{0.33}Mn_{0.33}Co_{0.33}O_2$ was formed.

Figures 24A, 24B:
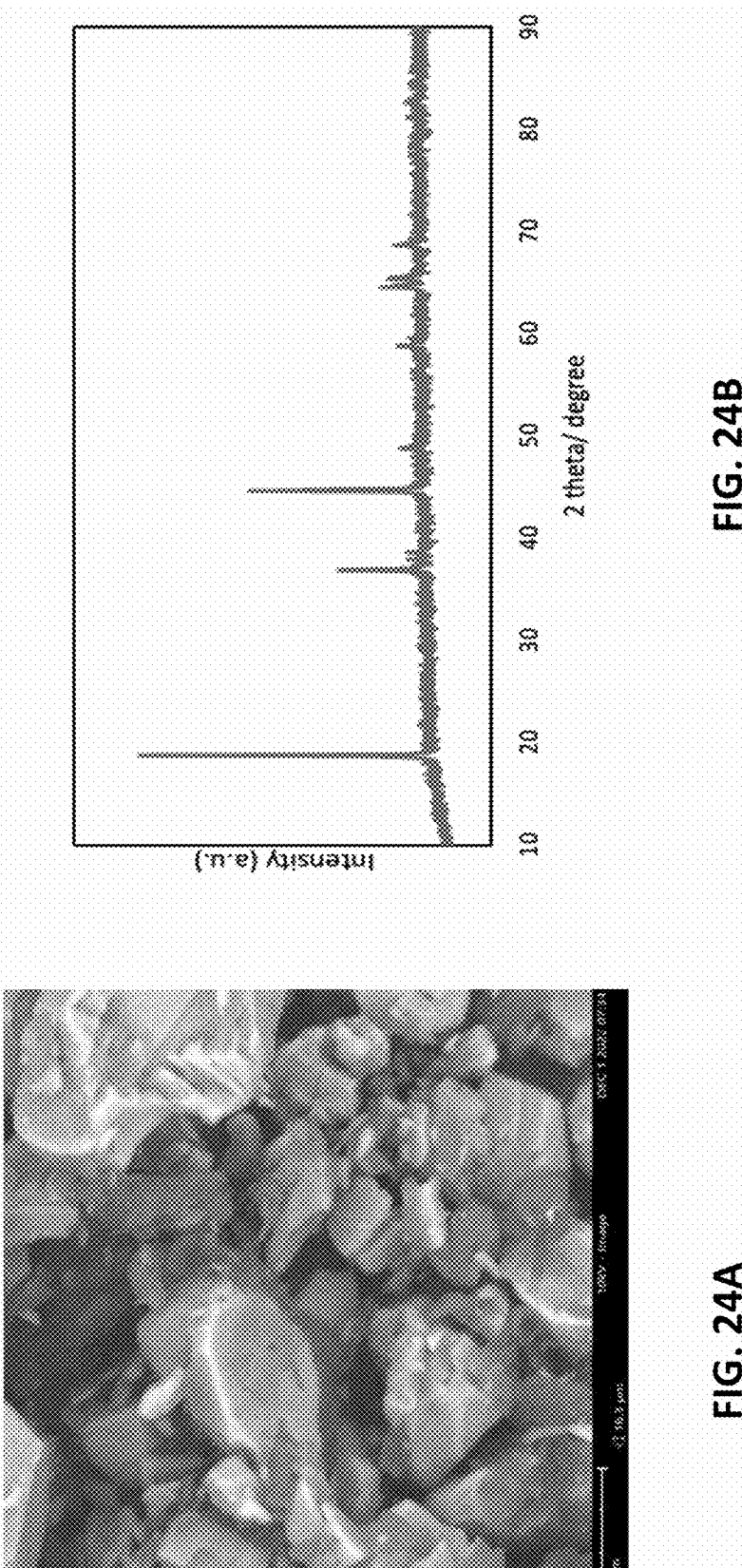
FIG. 24A is an SEM of $LiNi_{0.6}Mn_{0.2}Co_{0.2}O_2$ 896 made from recycled $LiNi_{0.33}Mn_{0.33}Co_{0.33}O_2$.
FIG. 24B is an XRD pattern of $LiNi_{0.6}Mn_{0.2}Co_{0.2}O_2$ 896 made from recycled $LiNi_{0.33}Mn_{0.33}Co_{0.33}O_2$.

FIG. 24A is an SEM and FIG. 24B is an XRD pattern of $LiNi_{0.6}Mn_{0.2}Co_{0.2}O_2$ 896 made from recycled $LiNi_{0.33}Mn_{0.33}Co_{0.33}O_2$. Single particles were made with similar average size in the range of about 2-4 micron. XRD showed pure phase $LiNi_{0.6}Mn_{0.2}Co_{0.2}O_2$ was formed.

Figure 25B:
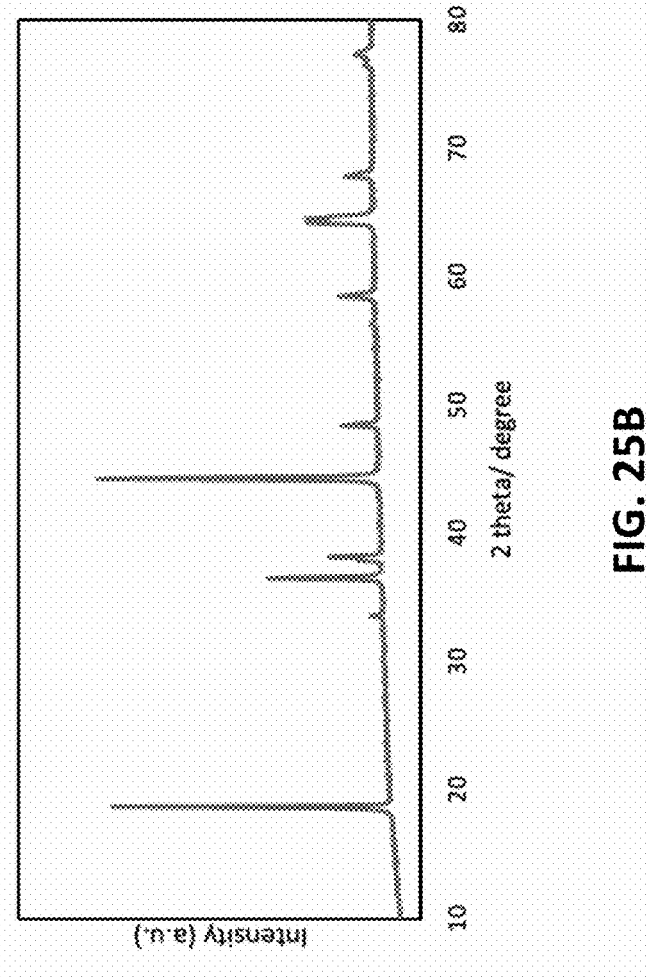
FIG. 25B is an XRD pattern of $LiNi_{0.8}Mn_{0.1}Co_{0.1}O_2$ 900 made from recycled $LiNi_{0.33}Mn_{0.33}Co_{0.33}O_2$.
Figure 25A:
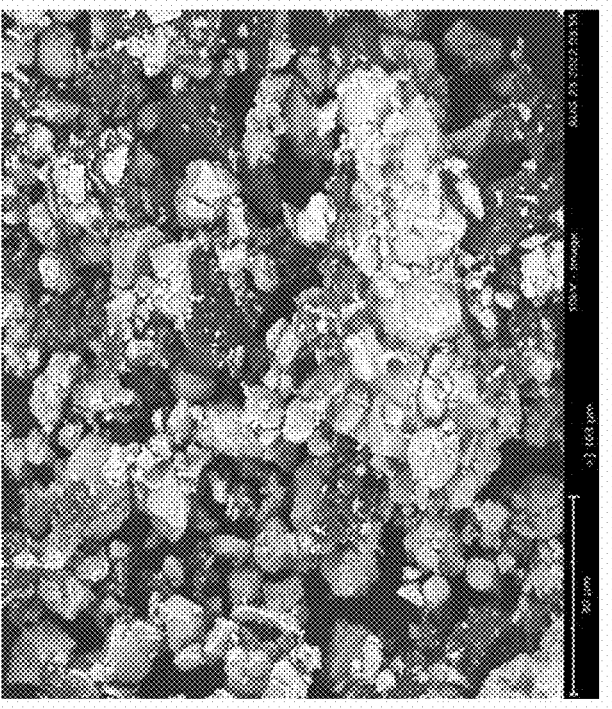
FIG. 25A is an SEM of $LiNi_{0.8}Mn_{0.1}Co_{0.1}O_2$ 900 made from recycled $LiNi_{0.33}Mn_{0.33}Co_{0.33}O_2$.

FIG. 25A is an SEM of and FIG. 25B is an XRD pattern of $LiNi_{0.8}Mn_{0.1}Co_{0.1}O_2$ 900 made from recycled $LiNi_{0.33}Mn_{0.33}Co_{0.33}O_2$. Single particles were also made with similar average size in the range of about 2-4 micron. XRD showed pure phase $LiNi_{0.8}Mn_{0.1}Co_{0.1}O_2$ was formed.

The following are experimental syntheses of various cathode compositions using the one-pot, organic acid-based methods disclosed herein.

EXAMPLES

Example 1—Synthesis of $LiMn_2O_4$ 800

Reagents were weighed out to ±0.0002 g of the calculated mass. To a vessel combine 1.0 mol of manganese acetate tetrahydrate, 1.0 mol of oxalic acid dihydrate, and 1.1 mol of lithium hydroxide monohydrate (1.1:1 Li:metal ratio) to form a mixture. The mixture was further mixed and ground. The manganese acetate tetrahydrate was pre-ground before use. The ground mixture was placed in a crucible in a muffle furnace and heated under a flow of oxygen at 2 L/min at a ramp rate of 2° C./min to 350° C. and held for 3 h, then heated to 550° C. at 2° C./min and held for 5 h to form a powder. The powder was cooled to room temperature and ground again. The ground powder was further calcined under a flow of oxygen at 2 L/min at a ramp rate of 2° C./min to 900° C. and held for 10 h to form $LiMn_2O_4$ 800. The $LiMn_2O_4$ was cooled to room temperature over a period of 9-11 h to yield a single crystalline black powder.

Example 2—Synthesis of $LiNi_{0.6}Mn_{0.2}Co_{0.2}O_2$ 804 Using Manganese and Cobalt Oxide Metal Compounds Reagents were weighed out to ±0.0002 g. To a 50 ml round bottom flask add 2 g of oxalic acid and 2 ml of water to form a mixture. While stirring, heat the mixture to 135° C. to form a melt. To the melt add 0.566 g of $Ni(OH)_2$, 0.142 g of MnO, 0.150 g of CoO, and 0.420 g of LiOH and continue to stir for 2 h at 135° C. The heated mixture is then allowed to cool slowly to form a cooled mixture. The cooled mixture was then put into a tube furnace under an oxygen atmosphere. The furnace was heated to 350° C. at a ramp rate of 10° C./min and then held for 3 hours. The temperature was then increased to 500° C. at 2° C./min and held for another 3 hours. The temperature was increased to 800° C. at a ramp rate of 2° C./min and held for 5 hours. The tube furnace was then allowed to cool to room temperature to form a single crystalline black powder, lithium mixed metal oxide $LiNi_{0.6}Mn_{0.2}Co_{0.2}O_2$. FIG. 4 is the x-ray diffraction pattern 402 for $LiNi_{0.6}Mn_{0.2}Co_{0.2}O_2$ 804 synthesized from manganese and cobalt oxide precursor metal compounds, according to an embodiment of the disclosure.

Example 3—Synthesis of $LiNi_{0.6}Mn_{0.2}Co_{0.2}O_2$ 808 Using Manganese Oxide Metal Compound Reagents were weighed out to ±0.0002 g. To a 50 ml round bottom flask add 2 g of oxalic acid and 2 ml of water to form a mixture. While stirring, heat the mixture to 135° C. to form a melt. To the melt add 0.566 g of $Ni(OH)_2$, 0.142 g of MnO, 0.186 g of $Co(OH)_2$, and 0.420 g of LiOH and continue to stir for 2 h at 135° C. The heated mixture is then allowed to cool slowly to form a cooled mixture. The cooled mixture was then put into a tube furnace under an oxygen atmosphere. The furnace was heated to 350° C. at a ramp rate of 10° C./min and then held for 3 hours. The temperature was then increased to 500° C. at 2° C./min and held for another 3 hours. The temperature was increased to 800° C. at a ramp rate of 2° C./min and held for 5 hours. The tube furnace was then allowed to cool to room temperature to form a single crystalline black powder, lithium mixed metal oxide $LiNi_{0.6}Mn_{0.2}Co_{0.2}O_2$. FIG. 5 is the x-ray diffraction pattern 506 for $LiNi_{0.6}Mn_{0.2}Co_{0.2}O_2$ 808 synthesized from manganese oxide precursor metal compound, according to an embodiment of the disclosure.

Example 4—Synthesis of $LiNi_{0.6}Mn_{0.2}Co_{0.2}O_2$ 812 Using Oxalic Acid Reagents were weighed out to ±0.0002 g of the calculated mass. To a vessel combine 2.10834 mol of lithium hydroxide monohydrate (1.1:1 Li:metal ratio), 1.150 mol of $Ni(OH)_2$, 0.38333 mol of manganese acetate tetrahydrate, 0.38333 mol of $Co(OH)_2$, and 1.91667 mol of oxalic acid dihydrate to form a mixture. Mixing and grind the components. Pre-grind the manganese acetate tetrahydrate before use. The ground mixture was placed in a crucible in a muffle furnace and heated under a flow of oxygen at 2 L/min at a ramp rate of 2° C./min to 150° C. and held for 3 h, then heated to 250° C. at 2° C./min and held for 5 h, then heated to 350° C. at 2° C./min and held for 3 h, then heated to 550° C. at 2° C./min and held for 5 h to form a powder. The powder was allowed to cool to room temperature over a period of 5-7 h and ground again. The heated and ground powder was placed in a crucible and heated to 930° C. at 2° C./min and held for 14 h under a flow of oxygen at 2 L/min to form $LiNi_{0.6}Mn_{0.2}Co_{0.2}O_2$ 812. The $LiNi_{0.6}Mn_{0.2}Co_{0.2}O_2$ was cooled to room temperature over a period of 9-11 h to yield a single crystalline black powder. XRD analysis: pure phase, 2.43% Ni—Li mixing (wR: 5.41%, GoF: 0.73). Inductively Coupled Plasma (ICP) analysis: Li (1.13); Ni (0.589); Mn (0.209); Co (0.202). Tap density: 2.28 g/cm³.

Example 5—Synthesis of $LiNi_{0.6}Mn_{0.2}Co_{0.2}O_2$ 816 Using Stearic Acid Reagents were weighed out to ±0.0002 g of the calculated mass. To a vessel combine 11 mmol of lithium hydroxide monohydrate (1.1:1 Li:metal ratio), 6 mmol of $Ni(OH)_2$, 2 mmol of manganese acetate tetrahydrate, 2 mmol of $Co(OH)_2$, and 10 mmol of stearic acid to form a mixture. The mixture was further mixed and ground. PRe-grind the manganese acetate tetrahydrate before use. The ground mixture was placed in a crucible in a muffle furnace and heated under a flow of oxygen at 2 L/min at a ramp rate of 2° C./min to 150° C. and held for 3 h, then heated to 250° C. at 2° C./min and held for 5 h, then heated to 350° C. at 2° C./min and held for 3 h, then heated to 550° C. at 2° C./min and held for 5 h to form a powder. The powder was allowed to cool to room temperature over a period of 5-7 h and ground again. The heated and ground powder was placed in a crucible and heated to 930° C. at 2° C./min and held for 14 h under a flow of oxygen at 2 L/min to form $LiNi_{0.6}Mn_{0.2}Co_{0.2}O_2$ 816. The $LiNi_{0.6}Mn_{0.2}Co_{0.2}O_2$ was cooled to room temperature over a period of 9-11 h to yield a single crystalline black powder. XRD analysis: pure phase, 8.59% Ni—Li mixing (wR: 5.03, GoF: 0.77). Scanning electron microscopy (SEM) analysis: 1-2 micron primary particle size.

Example 6—Synthesis of $LiNi_{0.75}Mn_{0.1}Co_{0.1}Al_{0.05}O_2$ 820

Reagents were weighed out to ±0.0002 g of the calculated mass. To a vessel combine 16.86 mmol of lithium hydroxide monohydrate (1.1:1 Li:metal ratio), 11.5 mmol of $Ni(OH)_2$, 1.533 mmol of manganese acetate tetrahydrate, 1.533 mmol of $Co(OH)_2$, 0.3833 mmol $Al_2O_3$, and 15.33 mmol of oxalic acid dihydrate to form a mixture. The mixture was further mixed and ground. The manganese acetate tetrahydrate was pre-ground before use. The ground mixture was placed in a crucible in a muffle furnace and heated under a flow of oxygen at 2 L/min at a ramp rate of 2° C./min to 150° C. and held for 3 h, then heated to 250° C. at 2° C./min and held for 5 h, then heated to 350° C. at 2° C./min and held for 3 h, then heated to 550° C. at 2° C./min and held for 5 h to form a powder. The powder was allowed to cool to room temperature over a period of 5-7 h and ground again. The heated and ground powder was placed in a crucible and heated to 930° C. at 2° C./min and held for 14 h under a flow of oxygen at 2 L/min to form $LiNi_{0.75}Mn_{0.1}Co_{0.1}Al_{0.05}O_2$ 820. The $LiNi_{0.75}Mn_{0.1}Co_{0.1}Al_{0.05}O_2$ was cooled to room temperature over a period of 9-11 h to yield a single crystalline black powder. XRD analysis: pure phase, 21.0% Li—Ni mixing (wR: 5.14%, GoF:0.79).

Example 7—Synthesis of $LiNi_{0.8}Co_{0.15}Al_{0.05}O_2$ 824

Reagents were weighed out to ±0.0002 g. To a 50 ml round bottom flask add 2 g of oxalic acid and 2 ml of water to form a mixture. While stirring at 420 rpm, heat the mixture to 140° C. to form a melt. To the melt add 0.746 g of $Ni(OH)_2$, 0.139 g of $Co(OH)_2$, 0.039 g of $Al(OH)_3$, and 0.420 g of LiOH and continue to stir for 2 h at 420 rpm at 140° C. The heated mixture is then allowed to cool slowly to room temperature to form a cooled mixture. The cooled mixture was comminuted with a mortar and pestle. The cooled mixture is then placed in a tube furnace under an oxygen atmosphere. The furnace is heated to 350° C. at a ramp rate of 10° C./min and held for 3 h. The temperature was increased to 500 C at 2° C./min and held for 3 h. The temperature was increased to 800° C. at 2° C./min and held for 5 h to form the lithium mixed metal oxide $LiNi_{0.8}Co_{0.15}Al_{0.05}O_2$ 824. The mixed metal oxide is then cooled to room temperature to yield a single crystalline black powder.

Example 8—Synthesis of $LiNi_{0.8}Co_{0.15}Al_{0.05}O_2$ 828

Reagents were weighed out to ±0.0002 g of the calculated mass. To a 100 ml round bottom flask was added 2 g of oxalic acid dihydrate and 2 ml of water to form solution. The solution was stirred at 1000 rpm and heated at 130° C. After the oxalic acid and water form a clear solution, 8 mmol of $Ni(OH)_2$, 1.5 mmol of $Co(OH)_2$ and 0.5 mmol of $Al(OH)_3$ are added and thoroughly mixed. A condenser column and 10 mmol of lithium hydroxide monohydrate were added and the mixture was stirred for 3 h under a flow of nitrogen. The material is transferred to a drying oven overnight at 90° C. The dried powder is transferred to an alumina crucible and placed in a tube furnace. Under a 2 L/min flow of oxygen the powder was heated to 350° C. at a rate of 10° C./min and held for 3 h. The powder is cooled to room temperature and ground. The powder was then heated to 500° C. at a rate of 2° C./min and held for 3 h, then heated to 800° C. at 2° C./min and held for 5 h. The powder was cooled to room temperature to yield $LiNi_{0.8}Co_{0.15}Al_{0.05}O_2$ 828 as a single crystalline black powder. XRD analysis: pure phase, 3.62% Li—Ni mixing (wR: 3.36%, GoF: 2.04).

Example 9—Synthesis of $LiNi_{0.8}Mn_{0.1}Co_{0.1}O_2$ 832 Using 1:1 Oxalic Acid Reagents were weighed out to ±0.0002 g of the calculated mass. To a vessel combine 1.98 mol of lithium hydroxide monohydrate (1.1:1 Li:metal ratio), 1.440 mol of $Ni(OH)_2$, 0.180 mol of manganese acetate tetrahydrate, 0.180 mol of $Co(OH)_2$, and 1.800 mol of oxalic acid dihydrate to form a mixture. The mixture was further mixed and ground. Pre-grind the manganese acetate tetrahydrate before use. The ground mixture was placed in a crucible in a muffle furnace and heated under a flow of oxygen at 2 L/min at a ramp rate of 2° C./min to 150° C. and held for 3 h, then heated to 250° C. at 2° C./min and held for 5 h, then heated to 350° C. at 2° C./min and held for 3 h, then heated to 550° C. at 2° C./min and held for 5 h to form a powder. The powder was allowed to cool to room temperature over a period of 5-7 h and ground again. The heated and ground powder was placed in a crucible and heated to 930° C. at 2° C./min and held for 14 h under a flow of oxygen at 2 L/min to form $LiNi_{0.8}Mn_{0.1}Co_{0.1}O_2$ 832. The $LiNi_{0.8}Mn_{0.1}Co_{0.1}O_2$ was cooled to room temperature over a period of 9-11 h to yield a single crystalline black powder. XRD analysis: pure phase, 5.00% Ni—Li mixing (wR: 5.44%, GoF: 0.77). Tap density: 2.243 $g/cm^3$. Specific surface area: 0.2722 $m^2/g$. ICP analysis: Li (1.07); Ni (0.793); Mn (0.105); Co (0.102).

Example 10—Synthesis of $LiNi_{0.8}Mn_{0.1}Co_{0.1}O_2$ 836 Using 0.5:1 Oxalic Acid The synthetic procedures for making $LiNi_{0.8}Mn_{0.1}Co_{0.1}O_2$ 836 are similar to that for $LiNi_{0.8}Mn_{0.1}Co_{0.1}O_2$ 832 but only 0.90 mol of oxalic acid dihydrate was used (0.5:1 oxalic acid:transition metal molar ratio). The $LiNi_{0.8}Mn_{0.1}Co_{0.1}O_2$ 836 was cooled to room temperature after calcining to yield a black powder.

Example 11—Synthesis of $LiNi_{0.8}Mn_{0.1}Co_{0.1}O_2$ 840 Using 0.25:1 Oxalic Acid The synthetic procedures for making $LiNi_{0.8}Mn_{0.1}Co_{0.1}O_2$ 840 are similar to that for $LiNi_{0.8}Mn_{0.1}Co_{0.1}O_2$ 832 but only 0.45 mol of oxalic acid dihydrate was used (0.25:1 oxalic acid:transition metal molar ratio). The $LiNi_{0.8}Mn_{0.1}Co_{0.1}O_2$ 840 was cooled to room temperature after calcining to yield a black powder.

Example 12—Synthesis of $LiNi_{0.8}Mn_{0.1}Co_{0.1}O_2$ 844 Using 0.1:1 Oxalic Acid The synthetic procedures for making $LiNi_{0.8}Mn_{0.1}Co_{0.1}O_2$ 844 are similar to that for $LiNi_{0.8}Mn_{0.1}Co_{0.1}O_2$ 832 but only 0.18 mol of oxalic acid dihydrate was used (0.1:1 oxalic acid:transition metal molar ratio). The $LiNi_{0.8}Mn_{0.1}Co_{0.1}O_2$ 844 was cooled to room temperature after calcining to yield a black powder.

Example 13—Synthesis of $LiNi_{0.8}Mn_{0.1}Co_{0.1}O_2$ 848 Using 0.05:1 Oxalic Acid The synthetic procedures for making $LiNi_{0.8}Mn_{0.1}Co_{0.1}O_2$ 848 are similar to that for $LiNi_{0.8}Mn_{0.1}Co_{0.1}O_2$ 832 but only 0.090 mol of oxalic acid dihydrate was used (0.05:1 oxalic acid:transition metal molar ratio). The $LiNi_{0.8}Mn_{0.1}Co_{0.1}O_2$ 848 was cooled to room temperature after calcining to yield a black powder.

Example 14—Synthesis of $LiNi_{0.8}Mn_{0.1}Co_{0.1}O_2$ 852 Using 0.025:1 Oxalic Acid The synthetic procedures for making $LiNi_{0.8}Mn_{0.1}Co_{0.1}O_2$ 852 are similar to that for $LiNi_{0.8}Mn_{0.1}Co_{0.1}O_2$ 832 but only 0.045 mol of oxalic acid dihydrate was used (0.025:1 oxalic acid:transition metal molar ratio). The $LiNi_{0.8}Mn_{0.1}Co_{0.1}O_2$ 852 was cooled to room temperature after calcining to yield a black powder.

Example 15—Synthesis of $LiNi_{0.8}Mn_{0.1}Co_{0.1}O_2$ 856 Using 0.01:1 Oxalic Acid The synthetic procedures for making $LiNi_{0.8}Mn_{0.1}Co_{0.1}O_2$ 856 are similar to that for $LiNi_{0.8}Mn_{0.1}Co_{0.1}O_2$ 832 but only 0.018 mol of oxalic acid dihydrate was used (0.01:1 oxalic acid:transition metal molar ratio). The $LiNi_{0.8}Mn_{0.1}Co_{0.1}O_2$ 856 was cooled to room temperature after calcining to yield a black powder.

Example 16—Synthesis of $LiNi_{0.8}Mn_{0.1}Co_{0.1}O_2$ 860 Using No Oxalic Acid The synthetic procedures for making $LiNi_{0.8}Mn_{0.1}Co_{0.1}O_2$ 860 are similar to that for $LiNi_{0.8}Mn_{0.1}Co_{0.1}O_2$ 832 but no oxalic acid dihydrate was used. The $LiNi_{0.8}Mn_{0.1}Co_{0.1}O_2$ 860 was cooled to room temperature after calcining to yield a black powder.

Example 17—Synthesis of $LiNi_{0.75}Mn_{0.1}Co_{0.1}Nb_{0.05}O_2$ 864

Reagents were weighed out to ±0.0002 g of the calculated mass. To a vessel combine 16.866 mol of lithium hydroxide monohydrate (1.1:1 Li:metal ratio), 11.500 mol of $Ni(OH)_2$, 1.533 mol of manganese acetate tetrahydrate, 1.533 mol of $Co(OH)_2$, 0.767 mol of $Nb_2O_5$, and 15.333 mol of oxalic acid dihydrate. The reagents were mixed and ground. Pre-grind the manganese acetate tetrahydrate before use. The ground mixture was placed in an alumina crucible in a muffle furnace and heated under a flow of oxygen at 2 L/min at a ramp rate of 2° C./min to 150° C. and held for 3 h, then heated to 250° C. at 2° C./min and held for 5 h, then heated to 350° C. at 2° C./min and held for 3 h, then heated to 550° C. at 2° C./min and held for 5 h to form a powder. The powder was allowed to cool to room temperature over a period of 5-7 h and ground again. The heated and ground powder was placed in a crucible and heated to 930° C. at 2° C./min and held for 14 h under a flow of oxygen at 2 L/min to form $LiNi_{0.75}Mn_{0.1}Co_{0.1}Nb_{0.05}O_2$ 864. The $LiNi_{0.75}Mn_{0.1}Co_{0.1}Nb_{0.05}O_2$ was cooled to room temperature over a period of 9-11 h to yield a single crystalline black powder. XRD analysis: a (2.8872 Å); c (14.24985 Å); V (102.871 Å³). Minor amount of NiO is present. SEM analysis: single crystal particles of size 2-3 micron.

Example 18—Synthesis of $LiNi_{0.75}Mn_{0.1}Co_{0.1}Zr_{0.053}O_2$ 868 with Excess Zr Reagents were weighed out to ±0.0002 g of the calculated mass. To a vessel combine 16.921 mol of lithium hydroxide monohydrate (1.1:1 Li:metal ratio), 11.537 mol of $Ni(OH)_2$, 1.538 mol of manganese acetate tetrahydrate, 1.538 mol of $Co(OH)_2$, 0.815 mol of $ZrO_2$, and 15.383 mol of oxalic acid dihydrate. The reagents were mixed and ground. Pre-grind the manganese acetate tetrahydrate before use. The ground mixture was placed in an alumina crucible in a muffle furnace and heated under a flow of oxygen at 2 L/min at a ramp rate of 2° C./min to 150° C. and held for 3 h, then heated to 250° C. at 2° C./min and held for 5 h, then heated to 350° C. at 2° C./min and held for 3 h, then heated to 550° C. at 2° C./min and held for 5 h to form a powder. The powder was allowed to cool to room temperature over a period of 5-7 h and ground again. The heated and ground powder was placed in a crucible and heated to 930° C. at 2° C./min and held for 14 h under a flow of oxygen at 2 L/min to form $LiNi_{0.75}Mn_{0.1}Co_{0.1}Zr_{0.053}O_2$ 868. The $LiNi_{0.75}Mn_{0.1}Co_{0.1}Zr_{0.053}O_2$ was cooled to room temperature over a period of 9-11 h to yield a single crystalline black powder. XRD analysis: a (2.89081 Å); c (14.26784 Å); V (103.259 Å³). Minor amount of $Li_2ZrO_3$ is present. SEM analysis: single crystal particles of size 2-3 micron.

Example 19—Synthesis of $LiNi_{0.9}Mn_{0.05}Co_{0.05}O_2$ 872

Reagents were weighed out to ±0.0002 g of the calculated mass. To a vessel combine 14.0558 mmol of lithium hydroxide monohydrate (1.1:1 Li:metal ratio), 11.5 mmol of $Ni(OH)_2$, 0.63889 mmol of manganese acetate tetrahydrate, 0.63889 mmol of $Co(OH)_2$, and 12.778 mmol of oxalic acid dihydrate to form a mixture. The mixture was further mixed and ground. The manganese acetate tetrahydrate was pre-ground before use. The ground mixture was placed in a crucible in a muffle furnace and heated under a flow of oxygen at 2 L/min at a ramp rate of 2° C./min to 150° C. and held for 3 h, then heated to 250° C. at 2° C./min and held for 5 h, then heated to 350° C. at 2° C./min and held for 3 h, then heated to 550° C. at 2° C./min and held for 5 h to form a powder. The powder was allowed to cool to room temperature over a period of 5-7 h and ground again. The heated and ground powder was placed in a crucible and heated to 930° C. at 2° C./min and held for 14 h under a flow of oxygen at 2 L/min to form $LiNi_{0.9}Mn_{0.05}Co_{0.05}O_2$ 872. The $LiNi_{0.9}Mn_{0.05}Co_{0.05}O_2$ was cooled to room temperature over a period of 9-11 h to yield single crystalline black powder. XRD analysis: pure phase, 12.5% Li—Ni mixing (wR: 6.07%, GoF: 0.89).

Example 20—Synthesis of $LiNi_{0.9}Mn_{0.05}Al_{0.05}O_2$ 876 Using Oxalic Acid Reagents were weighed out to ±0.0002 g of the calculated mass. To a vessel combine 14.056 mmol of lithium hydroxide monohydrate (1.1:1 Li:metal ratio), 11.5 mmol of $Ni(OH)_2$, 0.63889 mmol of manganese acetate tetrahydrate, 0.31944 mmol of $Al_2O_3$, and 12.778 mmol of oxalic acid dihydrate to form a mixture. The mixture was further mixed and ground. The manganese acetate tetrahydrate was pre-ground before use. The ground mixture was placed in a crucible in a muffle furnace and heated under a flow of oxygen at 2 L/min at a ramp rate of 2° C./min to 150° C. and held for 3 h, then heated to 250° C. at 2° C./min and held for 5 h, then heated to 350° C. at 2° C./min and held for 3 h, then heated to 550° C. at 2° C./min and held for 5 h to form a powder. The powder was allowed to cool to room temperature over a period of 5-7 h and ground again. The heated and ground powder was placed in a crucible and heated to 930° C. at 2° C./min and held for 14 h under a flow of oxygen at 2 L/min to form $LiNi_{0.9}Mn_{0.05}Al_{0.05}O_2$ 876. The $LiNi_{0.9}Mn_{0.05}Al_{0.05}O_2$ was cooled to room temperature over a period of 9-11 h to yield single crystalline black powder. XRD analysis: pure phase, 12.0% Li—Ni mixing (wR: 5.94%, GoF: 0.81).

Example 21—Synthesis of LiFePO$_4$ 880 Using Oxalic Acid

Reagents were weighed out to ±0.0002 g of the calculated mass. To a vessel combine 10 mmol of ferrous oxalate dihydrate, 10 mmol of ammonium dihydrogen phosphate, 5 mmol of lithium carbonate and 10 mmol of oxalic acid dihydrate to form a mixture. The mixture was further mixed and ground to a fine powder. The fine powder was transferred to a flask equipped with a condenser and a hot plate. The powder was stirred at 200 rpm heated at 140° C. for 2-5 h. The heated powder was cooled to room temperature and ground again. The ground mixture was placed in a crucible in a muffle furnace and heated under a flow of nitrogen at 2 L/min at a ramp rate of 1° C./min to 350° C. and held for 5 h to form a heated powder. The powder was cooled to room temperature and ground again. The ground powder was further calcined under a flow of nitrogen at 2 L/min at a ramp rate of 1° C./min to 700° C. and held for 5 h to form LiFePO$_4$ 880. The LiFePO$_4$ was cooled to room temperature over a period of 7-11 h to yield single crystalline black powder.

Example 22—Increase Particle Size of $LiNi_{0.8}Mn_{0.1}Co_{0.1}O_2$ 884

A single crystalline sample of $LiNi_{0.8}Mn_{0.1}Co_{0.1}O_2$ 884 was made using a synthetic procedure similar to that for $LiNi_{0.8}Mn_{0.1}Co_{0.1}O_2$ 832 previously described herein in Example 9. A 10 g sample of $LiNi_{0.8}Mn_{0.1}Co_{0.1}O_2$ 884 was added to a 500 ml yttria stabilized zirconia (YSZ) grinding vial along with 10×10 mm balls and 20×6 mm balls made of YSZ. The material was milled in a planetary ball mill (Vivtek Instruments) at 600 rpm for 15 mins then allowed to rest and cool for 5 mins. This cycle was repeated a further three more times for a total of one hour of milling. A small portion of milled material was set aside for XRD analysis. The rest of the material was transferred to an Al$_2$O$_3$ crucible and placed in a muffle furnace. The material was heated from room temperature to 930° C. at 10° C./min and held for 14 h under a flow of oxygen at 2 L/min to form larger particle size $LiNi_{0.8}Mn_{0.1}Co_{0.1}O_2$ 888. The furnace was cooled to room temperature over a period of 7-11 h to yield a black powder that was ground in a mortar and pestle.

Example 23—Synthesis of $LiNi_{0.33}Mn_{0.33}Co_{0.33}O_2$ 892 from Recycled $LiNi_{0.33}Mn_{0.33}Co_{0.33}O_2$ Reagents were weighed out to ±0.0002 g of the calculated mass. To a vessel combine 20.87 mmol of lithium hydroxide monohydrate (1.1:1 Li:metal ratio), 6.52 mmol of Ni(OH)$_2$, 6.52 mmol of manganese acetate tetrahydrate, 18.97 mmol of oxalic acid dihydrate and 6.52 mmol of 1:1:1 NMC carbonate to form a mixture. The mixture was further mixed and ground. The manganese acetate tetrahydrate was pre-ground before use. The ground mixture was placed in a crucible in a muffle furnace and heated under a flow of oxygen at 2 L/min at a ramp rate of 10° C./min to 150° C. and held for 2 h, then heated to 350° C. at 10° C./min and held for 3 h, then heated to 550° C. at 10° C./min and held for 5 h to form a powder. The powder was allowed to cool to room temperature over a period of 5-7 h and ground again. The heated and ground powder was placed in a crucible and heated to 930° C. at 10° C./min and held for 14 h under a flow of oxygen at 2 L/min to form $LiNi_{0.33}Mn_{0.33}Co_{0.33}O_2$ 892. The $LiNi_{0.33}Mn_{0.33}Co_{0.33}O_2$ was cooled to room temperature over a period of 9-11 h to yield single crystalline black powder. XRD analysis: pure phase.

Example 24—Synthesis of $LiNi_{0.6}Mn_{0.2}Co_{0.2}O_2$ 896 from Recycled $LiNi_{0.33}Mn_{0.33}Co_{0.33}O_2$ Reagents were weighed out to ±0.0002 g of the calculated mass. To a vessel combine 95.18 mmol of lithium hydroxide monohydrate (1.1:1 Li:metal ratio), 51.92 mmol of Ni(OH)$_2$, 17.30 mmol of manganese acetate tetrahydrate, 64.90 mmol of oxalic acid dihydrate (0.75:1 oxalic acid:metal ratio) and 17.30 mmol of 1:1:1 NMC carbonate to form a mixture. The mixture was further mixed and ground. The manganese acetate tetrahydrate was pre-ground before use. The ground mixture was placed in a crucible in a muffle furnace and heated under a flow of oxygen at 2 L/min at a ramp rate of 10° C./min to 150° C. and held for 2 h, then heated to 350° C. at 10° C./min and held for 3 h, then heated to 550° C. at 10° C./min and held for 5 h to form a powder. The powder was allowed to cool to room temperature over a period of 5-7 h and ground again. The heated and ground powder was placed in a crucible and heated to 930° C. at 10° C./min and held for 14 h under a flow of oxygen at 2 L/min to form $LiNi_{0.6}Mn_{0.2}Co_{0.2}O_2$ 896. The $LiNi_{0.6}Mn_{0.2}Co_{0.2}O_2$ was cooled to room temperature over a period of 9-11 h to yield single crystalline black powder. XRD analysis: pure phase.

Example 25—Synthesis of $LiNi_{0.8}Mn_{0.1}Co_{0.1}O_2$ 900 from Recycled $LiNi_{0.33}Mn_{0.33}Co_{0.33}O_2$ Reagents were weighed out to ±0.0002 g of the calculated mass. To a vessel combine 95.18 mmol of lithium hydroxide monohydrate (1.5:1 Li:metal ratio), 69.23 mmol of Ni(OH)$_2$, 8.65 mmol of manganese acetate tetrahydrate, 158.35 mmol of oxalic acid dihydrate (1.83:1 oxalic acid:metal ratio) and 8.6 mmol of 1:1:1 NMC carbonate to form a mixture. The mixture was further mixed and ground. The manganese acetate tetrahydrate was pre-ground before use. The ground mixture was placed in a crucible in a muffle furnace and heated under a flow of oxygen at 2 L/min at a ramp rate of 10° C./min to 150° C. and held for 2 h, then heated to 350° C. at 10° C./min and held for 3 h, then heated to 550° C. at 10° C./min and held for 5 h to form a powder. The powder was allowed to cool to room temperature over a period of 5-7 h and ground again. The heated and ground powder was placed in a crucible and heated to 930° C. at 10° C./min and held for 14 h under a flow of oxygen at 2 L/min to form $LiNi_{0.8}Mn_{0.1}Co_{0.1}O_2$ 900. The $LiNi_{0.8}Mn_{0.1}Co_{0.1}O_2$ was cooled to room temperature over a period of 9-11 h to yield single crystalline black powder. XRD analysis: pure phase.

The invention has been described with reference to various specific and preferred embodiments and techniques. Nevertheless, it is understood that many variations and modifications may be made while remaining within the spirit and scope of the invention.

What is claimed is:

1. A method of producing a particulate lithium metal phosphate $Li(M5)PO_4$, the method comprising:

providing an apparatus;

adding a solid organic acid to the apparatus;

adding a lithium compound $Li_{x1}(A)$ where x1 is 1-3 to the apparatus;

adding a phosphate-containing compound to the apparatus;

adding a metal compound $(M5)(A)_x$ where x is 1 or 2 to the apparatus;

mixing the solid organic acid, the lithium compound, the phosphate-containing compound and the metal compound in the apparatus to form a mixture;

melting the solid organic acid in the apparatus to form a liquid organic acid;

calcining the mixture, including the liquid organic acid, in an inert gas to yield a lithium metal phosphate;

cooling the lithium metal phosphate; and sizing the cooled lithium metal phosphate to produce the particulate lithium metal phosphate having a predetermined average particle size.

2. The method of claim 1, wherein the melting step is performed before the mixing step.

3. The method of claim 1, wherein the mixing step is performed before the melting step.

4. The method of claim 1, wherein the melting step and calcining step are achieved by a gradual addition of heat, so as to first melt the organic acid and then calcine the mixture, including the liquid organic acid.

5. The method of claim 1, wherein the mixing step, the melting step and the calcining step are performed in the apparatus.

6. The method of claim 5, wherein the apparatus is a rotary calciner.

7. The method of claim 1, wherein M5 is selected from the group consisting of iron, nickel, manganese, or cobalt.

8. The method of claim 1, wherein A is an anionic component that is selected from the group consisting of hydroxide, carbonate, acetate, alkoxide, oxalate, nitrate, nitride, sulfate, acetylacetonate, and oxide.

9. The method of claim 1, wherein the phosphate-containing compound is selected from the group consisting of $(NH_4)_3PO_4$, $H_3PO_4$, $Na_3PO_4$, $Li_3PO_4$, $K_3PO_4$, $H(NH_4)_2PO_4$, and $H_2(NH_4)PO_4$.

10. The method of claim 1, further combining one or more additional metal compounds with the liquid organic acid to form a lithium mixed metal phosphate.

11. The method of claim 10, wherein the lithium mixed metal phosphate has the general formula $Li(M5)_a(M6)_bPO_4$ where a+b=1, $Li(M5)_a(M6)_b(M7)_cPO_4$ where a+b+c=1, or $Li(M5)_a(M6)_b(M7)_c(M8)_dPO_4$ where a+b+c+d=1.

12. The method of claim 11, wherein M5, M6, M7, and M8 are selected from the group consisting of iron, nickel, manganese, and cobalt.

\* \* \* \* \*